US011030686B2

(12) United States Patent
Phillips et al.

(10) Patent No.: US 11,030,686 B2
(45) Date of Patent: *Jun. 8, 2021

(54) SECURE SYSTEM

(71) Applicant: Capital One Services, LLC, McLean, VA (US)

(72) Inventors: Jeremy Phillips, Brooklyn, NY (US); Kurry Tran, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 47 days.

This patent is subject to a terminal disclaimer.

(21) Appl. No.: 16/506,304

(22) Filed: Jul. 9, 2019

(65) Prior Publication Data

US 2019/0355057 A1    Nov. 21, 2019

Related U.S. Application Data

(63) Continuation of application No. 15/983,617, filed on May 18, 2018, now Pat. No. 10,380,685.

(51) Int. Cl.
*G06Q 40/02* (2012.01)
*G06F 21/62* (2013.01)
(Continued)

(52) U.S. Cl.
CPC ....... *G06Q 40/025* (2013.01); *G06F 21/6245* (2013.01); *G06Q 40/00* (2013.01);
(Continued)

(58) Field of Classification Search
None
See application file for complete search history.

(56) References Cited

U.S. PATENT DOCUMENTS

2004/0177030 A1\*    9/2004    Shoham .................. G06Q 30/02
                                                                    705/38
2005/0065871 A1    3/2005    Gerhart et al.
(Continued)

FOREIGN PATENT DOCUMENTS

WO    2015085393 A1    6/2015

OTHER PUBLICATIONS

Jean-Marc; Damia, Violetta; Bonci, Riccardo; Gibran, Watfe, "The analytical credit dataset: A magnifying glass for analysing credit in the euro area", 2017, European Central Bank (ECB) (Year: 2017).\*

(Continued)

*Primary Examiner* — Christopher Bridges
(74) *Attorney, Agent, or Firm* — Harrity & Harrity, LLP

(57) ABSTRACT

A device may receive application questions for an individual applying for credit with an organization. The device may broadcast the application questions to additional devices that have access to a distributed ledger for sharing credit worthiness information to cause at least one of the additional devices to generate an application response to the application questions and to process the application response using a smart contract. The device may receive one or more application responses that have been encrypted. Each of the application responses may include particular credit worthiness information relating to the individual. The device may decrypt the application responses. The device may determine a credit worthiness score for the individual using the application responses. The device may perform one or more actions that allow the device or another device associated with the organization to use the credit worthiness score to determine whether to approve the individual for credit.

20 Claims, 15 Drawing Sheets

(51) Int. Cl.
*H04L 29/06* (2006.01)
*H04L 9/06* (2006.01)
*H04L 9/32* (2006.01)
*G06Q 40/00* (2012.01)

(52) U.S. Cl.
CPC .......... *H04L 9/0637* (2013.01); *H04L 9/3247* (2013.01); *H04L 63/10* (2013.01); *H04L 2209/38* (2013.01); *H04L 2209/56* (2013.01)

(56) References Cited

U.S. PATENT DOCUMENTS

| | | | |
|---|---|---|---|
| 2009/0327120 A1* | 12/2009 | Eze | G06Q 40/00 705/38 |
| 2010/0228658 A1* | 9/2010 | Ketelsen | G06Q 40/02 705/35 |
| 2016/0065540 A1 | 3/2016 | Androulaki et al. | |
| 2016/0371771 A1* | 12/2016 | Serrano | G06Q 40/025 |
| 2017/0132626 A1 | 5/2017 | Kennedy et al. | |
| 2018/0075527 A1* | 3/2018 | Nagla | G06Q 40/025 |
| 2018/0101684 A1* | 4/2018 | Murphy | H04L 9/30 |
| 2018/0158139 A1 | 6/2018 | Krajicek et al. | |
| 2018/0300708 A1 | 10/2018 | Dar | |
| 2019/0114706 A1 | 4/2019 | Bell et al. | |

OTHER PUBLICATIONS

Bloom, "Say Hello to Inclusive Credit," https://bloom.co/, Oct. 16, 2018, 22 pages.

Co-pending U.S. Appl. No. 15/983,617, filed May 18, 2018.

Israël J.M., et. al., "The Analytical Credit Dataset: A Magnifying Glass for Analysing Credit in the Euro Area," ECB Occasional Paper, Apr. 2017, No. 187, 45 pages (entire document).

Ateniese G., et al., "Redactable Blockchain- or -Rewriting History in Bitcoin and Friends", 2017 IEEE European Symposium on Security and Privacy (EUROS&P), Mar. 11, 2017, pp. 111-126, XP055553448.

Extended European Search Report for Application No. EP19175353.2, dated Oct. 2, 2019, 11 pages.

* cited by examiner

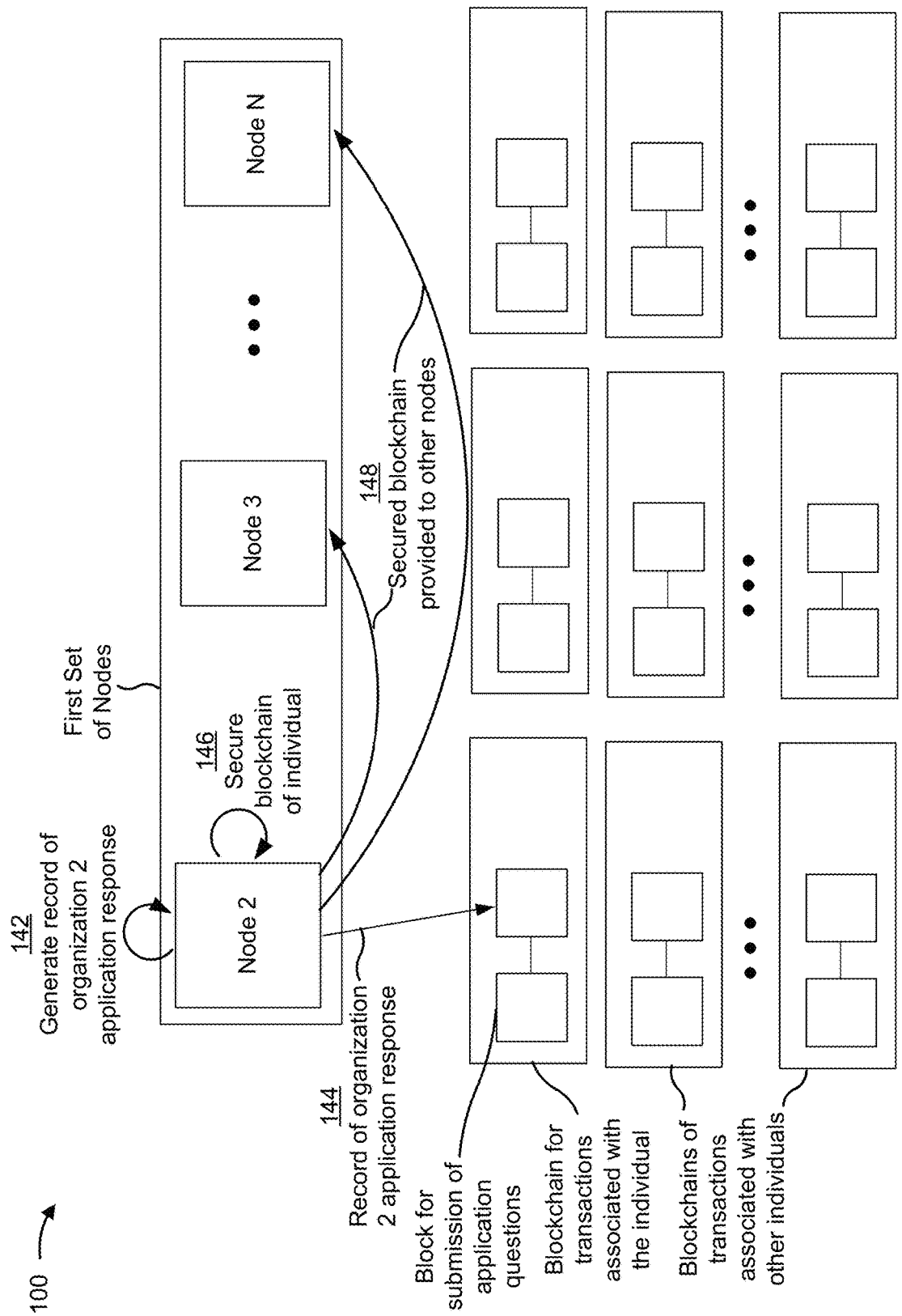

SECURE SYSTEM

RELATED APPLICATION

This application is a continuation of U.S. patent application Ser. No. 15/983,617, filed May 18, 2018, which is incorporated herein by reference.

BACKGROUND

A blockchain is a distributed database that maintains a continuously-growing list of records, called blocks, that may be linked together to form a chain. Each block in the blockchain may contain a timestamp and a link to a previous block and/or transaction. The blocks may be secured from tampering and revision. In addition, a blockchain may include a secure transaction ledger database shared by parties participating in an established, distributed network of computers. A blockchain may record a transaction (e.g., an exchange or transfer of information) that occurs in the network, thereby reducing or eliminating the need for trusted/centralized third parties. In some cases, the parties participating in a transaction may not know the identities of any other parties participating in the transaction but may securely exchange information. Further, the distributed ledger may correspond to a record of consensus with a cryptographic audit trail that is maintained and validated by a set of independent computers.

SUMMARY

According to some implementations, a device may include one or more memories and one or more processors that are communicatively coupled to the one or more memories. The one or more processors may receive, from a first device, a request for a credit worthiness score for an individual that is applying for credit. The first device may be associated with an organization offering the credit. The request may include application questions that have been encrypted using a private key associated with a digital signature of the individual. The first device may be part of a network of devices that have access to a distributed ledger for sharing credit worthiness information of a group of individuals. The one or more processors may broadcast the application questions that have been encrypted to one or more additional devices to cause at least one of the one or more additional devices to: generate an application response that includes responses to the application questions, record the application response in the distributed ledger, and provide the application response to the device. The one or more additional devices may be part of the network of devices that have access to the distributed ledger. The one or more processors may receive, from at least one of the one or more additional devices, one or more application responses that have been encrypted. Each application response, of the one or more application responses, may include particular credit worthiness information relating to the individual. The one or more processors may decrypt the one or more application responses. The one or more processors may determine the credit worthiness score using the one or more application responses that have been decrypted. The one or more processors may provide the credit worthiness score to the first device to allow the first device to use the credit worthiness score to determine whether to approve the individual for the credit.

According to some implementations, a method may include receiving, by a device, application questions for an individual that is applying for credit with a first organization. The device may be part of a network of devices that have access to a distributed ledger for sharing credit worthiness information for a group of individuals. The application questions may have been encrypted using a private key associated with the individual. The method may include broadcasting, by the device, the application questions to one or more additional devices that have access to the distributed ledger to cause at least one of the one or more additional devices to: generate an application response that includes responses to the application questions, process the application response using a smart contract, and provide the application response to the device. The method may include receiving, by the device and from at least one of the one or more additional devices, one or more application responses that have been encrypted. Each application response, of the one or more application responses, may include particular credit worthiness information relating to the individual. The method may include decrypting, by the device, the one or more application responses. The method may include determining, by the device, a credit worthiness score for the individual using the one or more application responses. The method may include performing, by the device, one or more actions that allow the device or another device associated with the first organization to use the credit worthiness score to determine whether to approve the individual for credit.

According to some implementations, a non-transitory computer-readable medium may store instructions that, when executed by one or more processors, cause the one or more processors to receive, from a first device, a request for a credit worthiness score for an individual that is applying for credit in a first country. The first device may be associated with an organization offering the credit. The request may include application questions that have been encrypted. The first device may be part of a network of devices that have access to a distributed ledger for sharing credit worthiness information of a group of individuals. The one or more instructions may cause the one or more processors to select one or more additional devices in the network of devices as targets to receive the application questions. The one or more instructions may cause the one or more processors to broadcast the application questions to the one or more additional devices that have been selected to permit at least one of the one or more additional devices to: generate an application response that includes responses to the application questions, and provide the application response. The one or more instructions may cause the one or more processors to receive, from at least one of the one or more additional devices, one or more application responses that have been encrypted. Each application response, of the one or more application responses, may include particular credit worthiness information relating to transactions performed by the individual in a second country. The one or more instructions may cause the one or more processors to decrypt the one or more application responses. The one or more instructions may cause the one or more processors to determine the credit worthiness score using the one or more application responses that have been decrypted. The one or more instructions may cause the one or more processors to provide the credit worthiness score to the first device to allow the first device to use the credit worthiness score to determine whether to approve the individual for the credit.

BRIEF DESCRIPTION OF THE DRAWINGS

FIGS. 1A-1J are diagrams of an example implementation described herein.

DETAILED DESCRIPTION

Figure 1A:
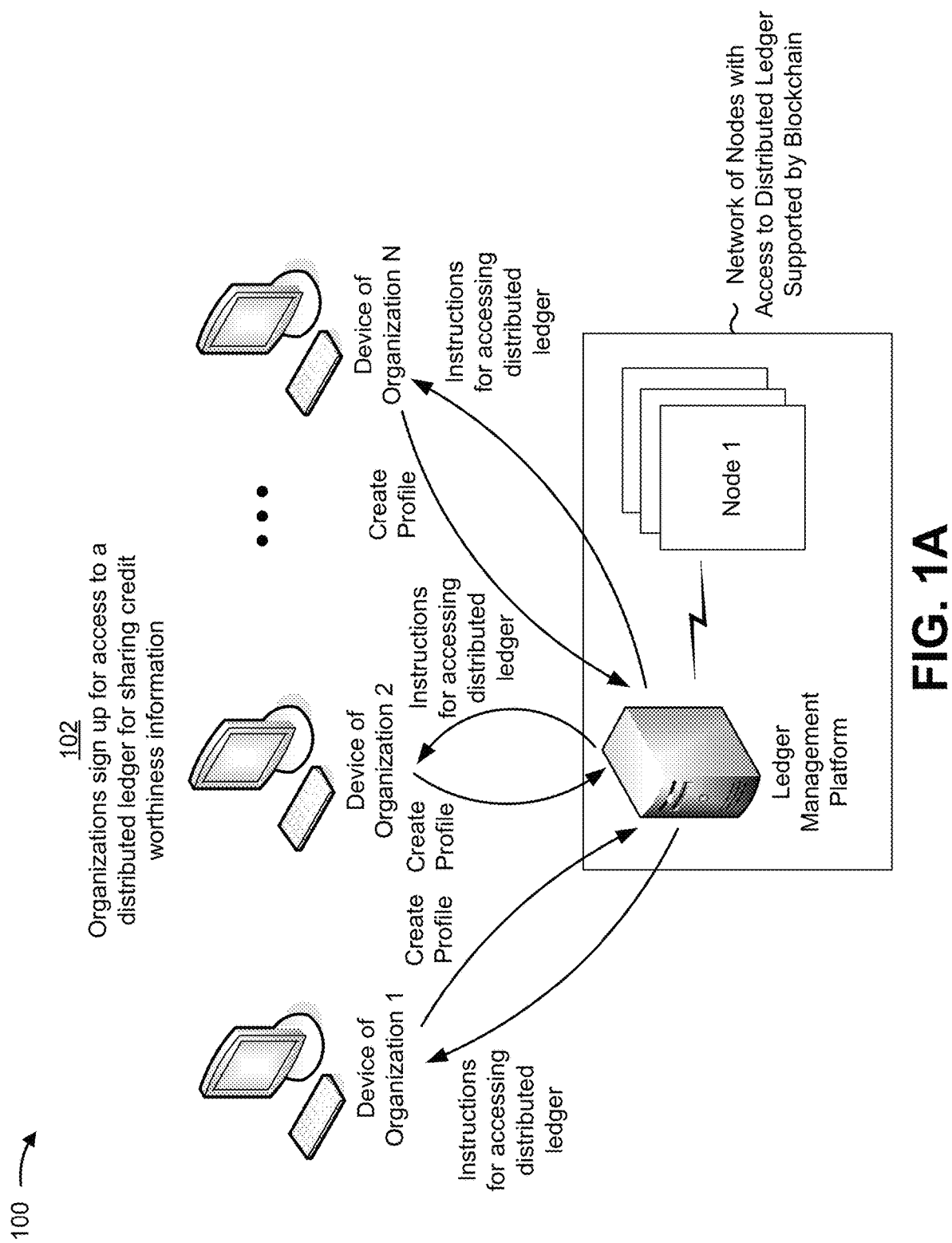

The following detailed description of example implementations refers to the accompanying drawings. The same reference numbers in different drawings may identify the same or similar elements.

When an individual moves from a first country to a second country, the individual's credit history from the first country may not be recognized by lending organizations within the second country. When the individual applies for credit in the second country (e.g., by applying for a loan, a credit card, etc.), a lender organization (e.g., a bank, a financial institution, etc.) may have a difficult time determining whether to provide the individual with the credit, how much credit to approve, and/or the like.

Additionally, the lending organization may pay a fee to one or more third party agencies in an effort to obtain the credit information of the individual. However, an international exchange of the individual's credit information between the lender organization and one or more third party agencies raises security concerns and data privacy concerns. For example, sharing of credit information of the individual raises security concerns due to the risk of the credit information being intercepted by unauthorized parties. Furthermore, different countries have different data privacy laws, which may make it difficult for the lending organization to interact with the one or more third party agencies in a manner that is compliant with data privacy laws.

Some implementations described herein provide a ledger management platform to determine a credit worthiness score of an individual that is applying for credit in a first country by interacting with a secure distributed ledger to obtain and analyze credit worthiness information associated with transactions made by the individual in a second country. For example, the ledger management platform may be part of a network of devices that have access to a distributed ledger for sharing credit worthiness information of a group of individuals. In this case, an individual may move to a first country, and may submit an application for credit with a first organization. After the individual submits the application for the credit, a first device associated with the first organization may provide, to the ledger management platform, a request for a credit worthiness score of the individual. The request may include application questions that may be used to determine the credit worthiness score, and may be encrypted using a private key associated with a digital signature of the individual.

Additionally, the ledger management platform may broadcast the encrypted application questions to one or more additional devices that have access to the distributed ledger. This may cause at least one of the one or more additional devices to generate application responses to the application questions, and to provide the application responses to the ledger management platform. Furthermore, the ledger management platform may decrypt the application responses, and may use the application responses to determine the credit worthiness score. Moreover, the ledger management platform may provide the credit worthiness score to the first device to allow the first device to use the credit worthiness score to determine whether to approve the individual for the credit. During this process, the ledger management platform, the first device, and/or the one or more additional devices may use the distributed ledger to store records of exchanges of credit worthiness information that were provided via the network.

In this way, the ledger management platform is able to provide the first device with a credit worthiness score that may be used to determine whether to approve the individual for the credit. Additionally, the ledger management platform is able to facilitate the distribution of credit worthiness information in a manner that is flexible, secure, distributed, and automated. For example, flexibility is provided by enabling execution of various smart contracts to ensure that credit worthiness information is shared in a manner that is compliant with laws of different jurisdictions.

Additionally, security is provided by supporting the distributed ledger with a tamper-resistant data structure (e.g., a blockchain), by implementing various forms of authentication, by restricting access to the distributed ledger to particular parties, and/or the like. For example, the distributed ledger may improve security by preserving an immutable record of credit worthiness information, by using cryptographic links between blocks of the distributed ledger (e.g., reducing the potential for unauthorized tampering with the credit worthiness information), and/or the like. Security is further improved as a result of devices that have access to the distributed ledger independently verifying each transaction that is added to the distributed ledger. Moreover, use of a distributed ledger also provides failover protection, in that the ledger management platform may continue to operate in a situation where one or more devices that have access to the distributed ledger fail.

Furthermore, several different stages of the process for managing credit worthiness information are automated, which may remove human subjectivity and waste from the process, and which may improve speed and efficiency of the process and conserve computing resources (e.g., processor resources, memory resources, and/or the like). Additionally, implementations described herein use a rigorous, computerized process to perform tasks or roles that were not previously performed or were previously performed using subjective human intuition or input. Finally, automating the process for managing credit worthiness information conserves computing resources (e.g., processor resources, memory resources, and/or the like) that would otherwise be wasted by using multiple different types of devices with different software, protocols, and configurations, and computing resources that would otherwise be wasted correcting problems that would arise from lack of consistency in the application of various transactions related to the credit worthiness information.

FIGS. 1A-1J are diagrams of an overview of an example implementation 100 described herein. For example, example implementation 100 may include a network of nodes (e.g., server computers, personal computers, etc.) that have access to a distributed ledger for sharing credit worthiness information of an individual. In this case, the network of nodes may include a management node, such as a ledger management platform, that is able to orchestrate distribution of information to other nodes in the network and/or is able to determine a credit worthiness score for the individual, as described herein.

As shown in FIG. 1A, and by reference number 102, a group of organizations (e.g., banks, financial institutions, lender organizations, etc.) may sign up for access to the distributed ledger, which may be used for sharing credit worthiness information of a group of individuals. The credit worthiness information may be for a group of individuals that are customers of the group of organizations, such as individuals that have a credit score, individuals that have performed transactions that may be used to determine a credit score, and/or the like.

Additionally, the credit worthiness information may include credit information relating to transactions made between individuals and a first group of organizations and/or rating information relating to transactions between individuals and a second group of organizations. The credit information may include information indicating a credit score, an income, a number of open lines of credit, an amount of outstanding debt, a mortgage payment history, a number timely (or untimely) payments made on behalf of the individuals, and/or the like. The rating information may include one or more third-party ratings that the particular individual has accrued via transactions with the second group of organizations, such as a ride sharing rating, a rating associated with online purchases, and/or the like.

In some implementations, employees of each organization may interact with an interface to sign up for access to the distributed ledger. For example, employees may use devices associated with the group of organizations (shown as a Device of Organization 1, a Device of Organization 2, and a Device of Organization N) to access an interface (e.g., a web interface, an application interface, etc.) that permits organizations to sign up for access to the distributed ledger.

As an example, an employee of a first organization may sign up for access to the distributed ledger by interacting with a web interface displayed on a first device (e.g., the Device of Organization 1) to create a profile for the first organization. The profile may include information indicating an organization name, an organization address, a unique identifier associated with the organization (e.g., a tax identifier), an organization type (e.g., a particular type of financial institution), one or more countries in which the first organization operates, an approval by a third-party organization that verifies the authenticity of organizations, and/or any other information that may be needed to obtain access to the distributed ledger.

In some implementations, the network of nodes that have access to the distributed ledger may be supported using a number of different types of devices or network configurations. For example, the nodes in the network may be one or more servers that are hosted within a number of different data centers distributed worldwide. In this case, after an organization creates a profile, the ledger management platform may assign or dedicate one or more nodes to the organization, and may provide a device associated with the organization with login information needed to access one or more services provided by the one or more nodes. For example, an organization may be assigned a first node, and an employee of the organization may use a device associated with the organization (e.g., a local desktop computer) to access a web interface that allows the employee to use one or more services provided by first node (e.g., the employee might use the first node to request credit worthiness information of an individual, as described further herein).

Additionally, or alternatively, the devices associated with the group of organizations may be used as nodes of the network. In this case, the ledger management platform may provide the devices associated with the organizations with instructions on how to install one or more software resources needed to allow the devices associated with the organizations to serve as the nodes. In some implementations, the network of nodes may be configured without a management node (e.g., the ledger management platform). In this case, one or more of the nodes may support software resources (e.g., virtual resources) that allow the one or more nodes to perform one or more functions described as being performed by the ledger management platform.

In this way, the ledger management platform is able to allow a group of organizations to sign up for access to the distributed ledger.

Figure 1B:
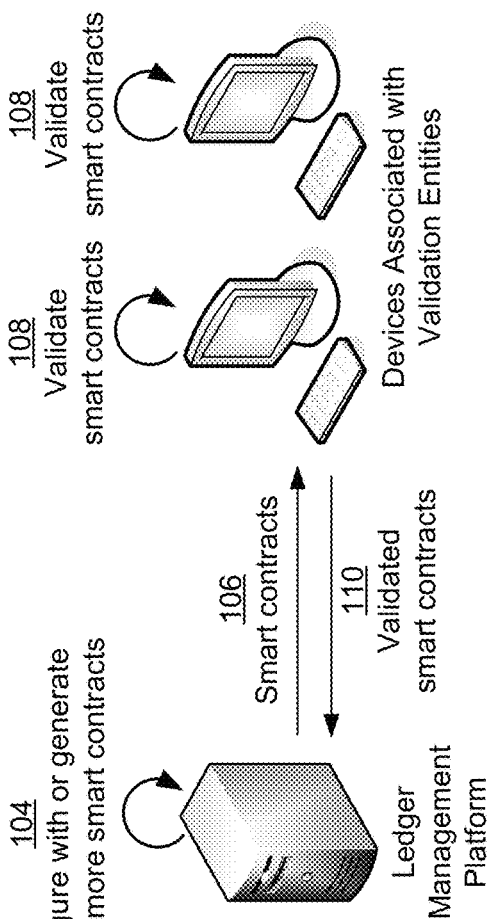

As shown in FIG. 1B, and by reference number 104, the ledger management platform may receive one or more smart contracts. For example, the ledger management platform may receive one or more smart contracts from devices associated with organizations that have access to the distributed, third-party organizations, and/or the like. In this case, the one or more smart contracts may be able to digitally facilitate, verify, and/or enforce negotiation or performance of a contract. The contract may involve an exchange of credit worthiness information of an individual and a particular type of payment (e.g., cryptocurrency, etc.).

In some implementations, the one or more smart contracts may include application questions that request credit worthiness information of an individual. For example, a smart contract may include credit-related application questions, such as a question requesting an individual's credit score, a current amount of outstanding debt, an income, a mortgage payment history, and/or the like. Additionally, or alternatively, the smart contact may include rating-related application questions, such as a question requesting an individual's rating for a popular ride sharing service, an individual's rating for a portal that supports online shopping, and/or the like.

In some implementations, the one or more smart contacts may include one or more conditions that, if satisfied, cause the ledger management platform to orchestrate providing payment to an organization that provided the requested credit worthiness information of the individual. For example, a smart contract may request a credit score of an individual, and may include a condition that is satisfied only if a value provided as a response is within a range of possible credit scores. As another example, a smart contract may request credit worthiness information using a yes or no question, and may include a condition that is only satisfied if a response is in a yes or no format. As another example, a smart contract may request credit worthiness information, and may include a condition that is satisfied only if a response is in compliance with data privacy laws of a particular jurisdiction.

As shown as an example, the ledger management platform may receive a first smart contract (shown as Smart Contract A) and a second smart contract (shown as Smart Contract B). As shown, the first smart contract and the second smart contract may phrase application questions differently such that the application questions are in compliance with data privacy laws of a first jurisdiction (shown as Country A) and a second jurisdiction (shown as Country B).

As shown by reference number 106, the ledger management platform may provide the one or more smart contracts to one or more devices associated with validation entities. For example, one or more validation entities may be used to independently validate and/or verify that particular smart contracts comply with rules or protocols used within the distributed ledger, data privacy laws of particular jurisdictions, and/or the like.

In some implementations, the one or more validation entities may be organizations capable of running a validation node (e.g., a validation node on an Ethereum platform). Additionally, or alternatively, the one or more validation entities may be organizations that are not part of the distributed ledger. Additionally, or alternatively, the one or more validation entities may be law firms, regulatory agencies, and/or organizations capable of verifying whether the smart contract is in compliance with data privacy laws of particular jurisdictions.

As shown by reference number 108, the devices associated with the validation entities may be used to validate the one or more smart contracts. As shown by reference number 110, the devices associated with the validation entities may provide the one more validated smart contracts to the ledger management platform. In some cases, a validation entity may join the network of nodes, and may include, as metadata within each smart contract, an authorized signature indicating that the validation entity has reviewed the smart contract and that the smart contract is in compliance with a particular rule or protocol used by devices with access to the distributed ledger, that the smart contract is in compliance with data privacy laws of a particular jurisdiction, and/or the like.

In some implementations, the ledger management platform may validate a smart contract using a machine learning technique. For example, the ledger management platform may train a machine learning model on data privacy law information and historical smart contracts that were found to be in compliance with the laws of the particular jurisdiction, and may use the machine learning model to verify whether a smart contract complies with particular data privacy laws.

The data privacy law information may indicate a restriction associated with a type of personal information that may be shared, a restriction associated with a degree to which personal information may be shared, a restriction indicating that personal information collected is able to be removed upon request of the individual, a restriction indicating that an individual is to be informed as to a specific purpose with which the individual's personal information may be used, and/or the like. The historical smart contracts may include particular application questions that were asked, conditions that were used, indicators of whether particular application questions were in compliance with the laws of the particular jurisdiction, and/or the like.

Additionally, the ledger management platform may use the machine learning model to determine whether particular application questions comply with data privacy laws of the particular jurisdiction. For example, the ledger management platform may receive a new smart contract that includes application questions that have yet to be validated. In this case, the ledger management platform may provide the new application questions as input to the machine learning model to cause the machine learning model to output an indicator of a likelihood of each of the new application questions complying with the data privacy laws of a particular jurisdiction. Additionally, the ledger management platform may validate an application question if the application question satisfies a threshold confidence level.

In some implementations, the ledger management platform may receive an expiring smart contract. For example, because certain data privacy laws may restrict a manner in which personal information of individuals may be distributed over the network of nodes, the ledger management platform may receive a smart contract that expires after a threshold time period. This may allow nodes requesting and/or receiving personal information to have limited access to the personal information before the smart contract expires and the personal information included in the smart contract is permanently deleted.

In some implementations, the ledger management platform may receive a smart contract that includes specific functions that comply with data privacy laws of particular jurisdictions. For example, rather than use separate smart contacts for each jurisdiction, the ledger management platform may receive or be configured with a single smart contract that includes separate functions for each jurisdiction, such that each function includes application questions that comply with a particular jurisdiction.

In some implementations, the network of nodes may be configured such that multiple distributed ledgers are utilized, where each distributed ledger uses a different smart contract. For example, the ledger management platform may be used to manage exchanges of credit worthiness information using a group of distributed ledgers, whereby each distributed ledger uses a particular smart contract that is in compliance with laws of a particular jurisdiction.

In this way, the ledger management platform is able to receive and validate smart contracts. Furthermore, the ledger management platform provides flexibility by enabling execution of various smart contracts to ensure that credit worthiness information is shared in a manner that is compliant with laws of different jurisdictions.

Figure 1C:
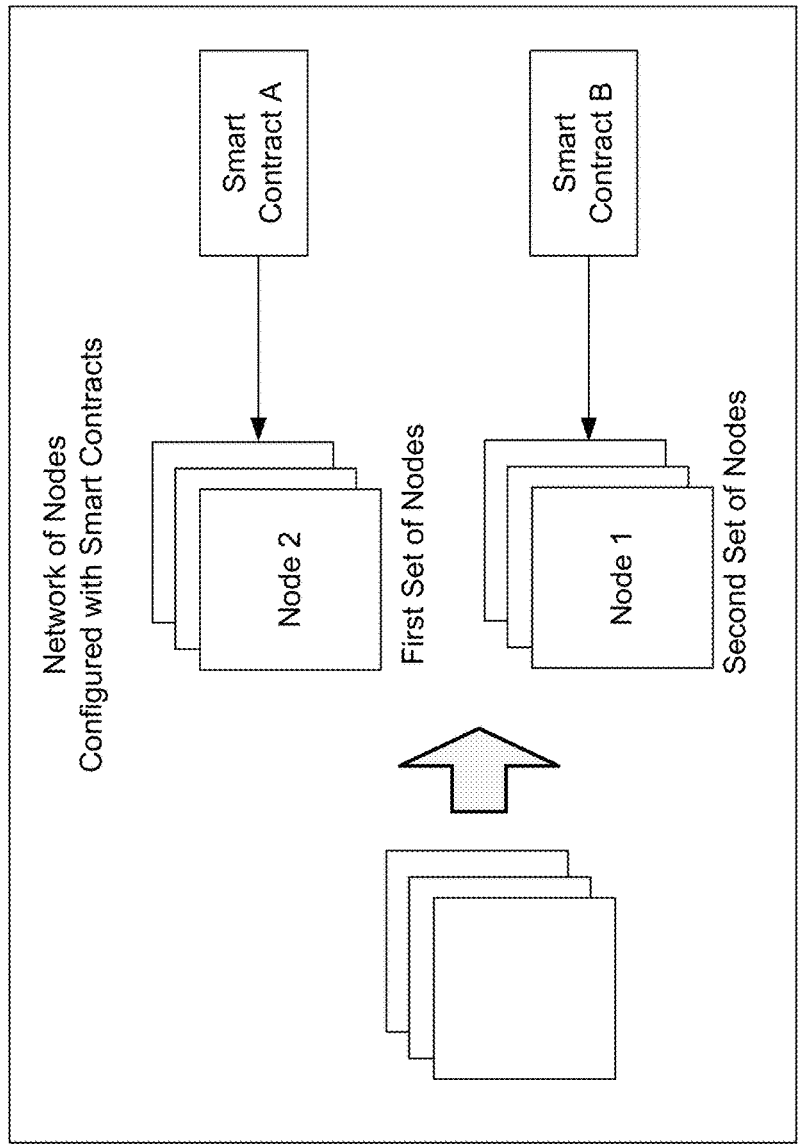

As shown in FIG. 1C, and by reference number 112, the ledger management platform may provide the one or more smart contracts to the network of nodes. In some implementations, the ledger management platform may provide the one or more smart contracts to each node in the network of nodes.

In some implementations, the ledger management platform may provide the one or more smart contracts to one or more sets of nodes. For example, the ledger management platform may provide the one or more smart contracts to one or more sets of nodes based on a distribution rule. As an example, a distribution rule may indicate to provide each node with a smart contract that is in compliance with laws of a jurisdiction in which an organization using the node operates. As shown as an example, the first smart contract (e.g., smart contract A) may be provided to a first set of nodes and the second smart contract (e.g., smart contract B) may be provided to a second set of nodes.

In some implementations, such as when the distributed ledger is supported by a blockchain, the network of nodes may adhere to a protocol for inter-node communication and/or validation of new transactions. For example, if a first node adds a transaction to the blockchain, the protocol may require that all other nodes in the network perform an independent validation of the transaction. However, if a smart contract used for the transaction is not supported by every node in the network, some of the nodes in the network may be unable to independently validate new transactions. To address this, the network of nodes may be separated into one or more sets of nodes, and the protocol for inter-node communication and/or validation may be revised such that only nodes within a particular set of nodes need to comply with the protocol.

In some implementations, the ledger management platform may provide, to each node in the network nodes, a smart contract that includes separate functions that comply with data privacy laws of particular jurisdictions. In this case, each node in the network of nodes may support the same smart contract, thereby ensuring that each node is able to satisfy the protocol for inter-node communication and/or validation of new transactions.

In this way, the ledger management platform is able to distribute the one or more smart contacts among the nodes network.

Figure 1D:
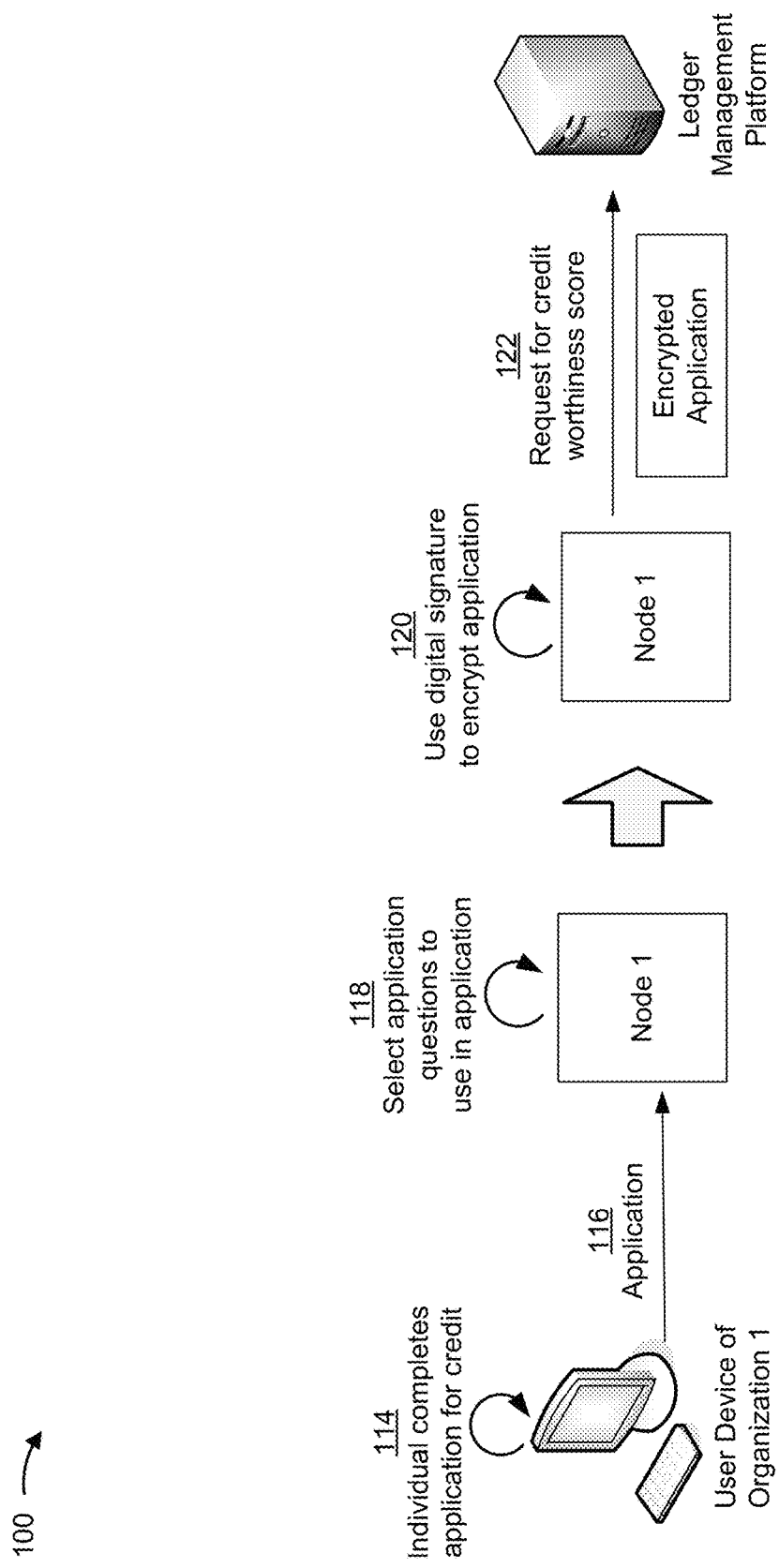

As shown in FIG. 1D, and by reference number 114, an individual may complete an application for credit. For example, an individual may interact with an interface of a device associated with the first organization (shown as Device of Organization 1) to complete an application to apply for a particular type of credit with the first organization.

The individual may be applying for credit in a first country in which the individual does not have a credit score (e.g., a country to which the individual has recently moved). The individual may have a credit score or information that may be used to determine a credit score based on transactions performed in a second country (e.g., a country in which the individual has previously lived, a country in which the individual has previously been approved for credit, etc.).

The application may be an application for a credit card, for a line of credit, for a home loan, and/or for any other type of credit offered by the first organization. The application may require the individual to provide a name, an address, contact information, a country of citizenship, a list of one or more credit lending institutions that had previously issued credit to the individual, a list of organizations that have rated the individual based on performance of a particular task (e.g., a ride sharing service where the individual is rated by drivers, an online shopping portal where the individual is rated by other users, etc.), and/or the like.

Furthermore, the individual may sign the application with a digital signature. The digital signature may be used as an indicator that the individual has been made aware of, and/or consents to, the first organization requesting credit worthiness information of the individual from one or more organizations that are a part of the network that has access to the distributed ledger (e.g., organizations that may have credit worthiness information of the individual based on transactions performed in the second country).

In some cases, the individual may include the individual's blockchain identifier in the application. For example, the distributed ledger may support a blockchain for the individual that provides a complete record of all transactions where the network of nodes were used to exchange information relating to the individual. In this case, the blockchain identifier for the individual may be used by devices in the network to identify the individual's blockchain.

Additionally, the blockchain identifier may have been assigned to the individual when the individual registered for one or more services in the second country (e.g., the country in which the individual has a credit score and used to live). As an example, when the individual registered for an account with a bank in the second country, if the bank had already joined the network to access the distributed ledger, the bank would assign the individual a blockchain identifier. In other cases, an organization (e.g., the bank) may assign the individual with a blockchain identifier after the individual has already used the organization for one or more services.

As shown by reference number 116, the device associated with the first organization may provide the application to the first node (e.g., the node associated with the first organization). As shown by reference number 118, the first node may select application questions that are to be used in the application. For example, the first node may identify application questions from a particular smart contract that is in compliance with data privacy laws of the first country and/or the second country, and may select the identified application questions for use as part of the individual's application. In some cases, the selected application questions may be shown to the individual to comply with data privacy laws of a particular jurisdiction.

As shown by reference number 120, the first node may use the digital signature of the individual to encrypt the application. For example, the user device of the first organization may execute a one-way hash function, or a similar function, to hash the application. In this case, the user device of the first organization may use the digital signature of the individual (e.g., which effectively serves as a private key) to encrypt the hashed application. By encrypting the hashed application, the user device of the first organization conserves processing resources relative to encrypting the entire application.

In some cases, a public key that is able to decrypt the hashed application may have been previously provisioned to one or more organizations that have credit worthiness information of the individual. In other cases, a public key that is able to decrypt the hashed application may be provided via a secure medium to one or more organizations that have credit worthiness information of the individual.

As shown by reference number 122, the first node may provide the ledger management platform with a request for a credit worthiness score of the individual. For example, the first node may provide the ledger management platform with a request for a credit worthiness score that includes the encrypted application of the individual.

In this way, the individual is able to complete an application for credit with the first organization, and the first organization is able to use the first node to provide the ledger management platform with a request for a credit worthiness score of the individual.

Figure 1E:
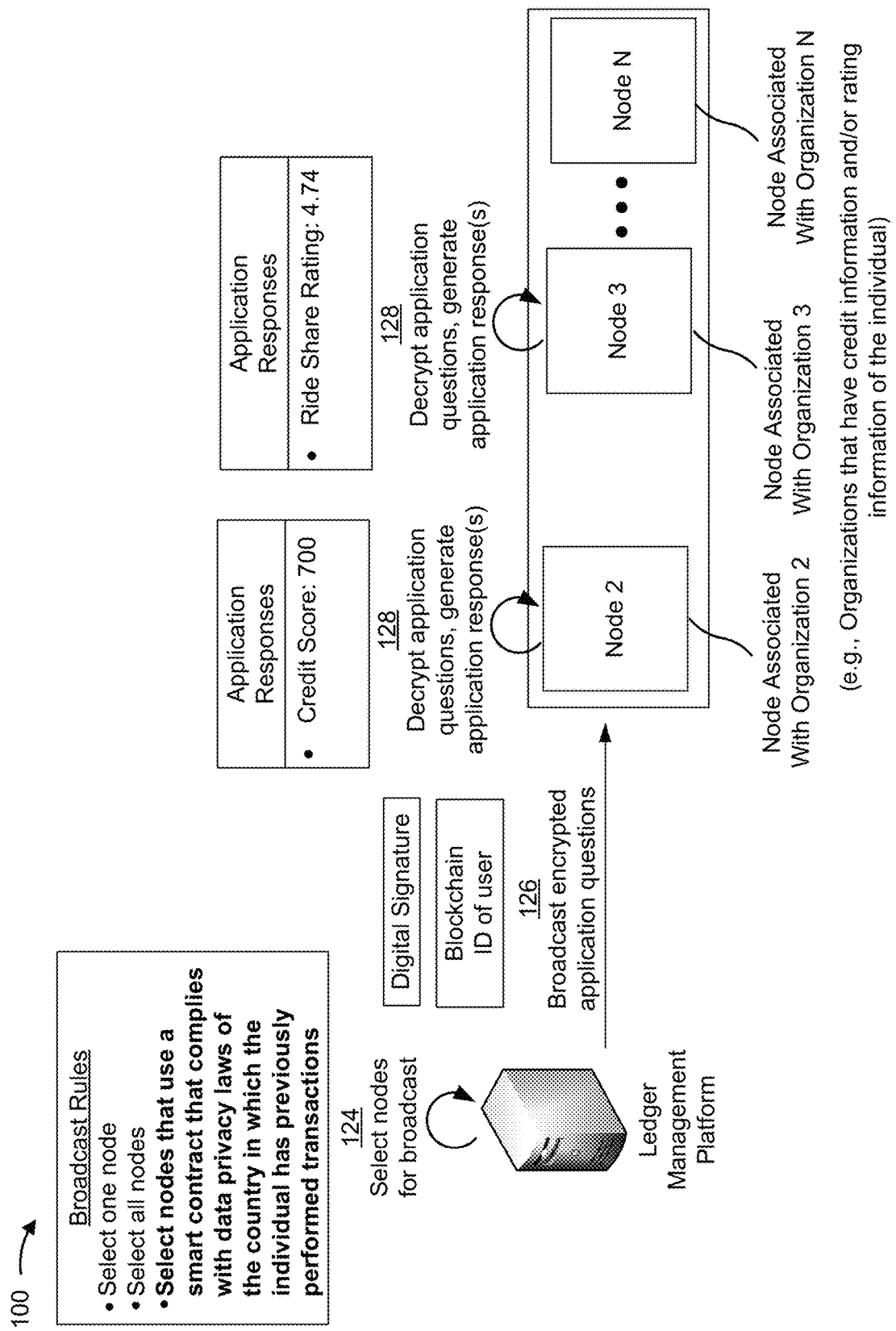

As shown in FIG. 1E, and by reference number 124, the ledger management platform may select one or more nodes as targets for a broadcast that includes the application questions. For example, the ledger management platform may selectively identify one or more nodes as targets for a broadcast that includes the application questions based on a broadcast rule. In this case, the ledger management platform may be configured with a particular broadcast rule, such as a first broadcast rule indicating to select the one or more nodes based on information identified in the request for the credit worthiness score, a second broadcast rule indicating to select all of the nodes in the network of nodes, a third broadcast rule indicating to select the one or more nodes based on the one or more nodes supporting a smart contract that is compliant with data privacy laws of a jurisdiction associated with the second country, and/or the like.

As an example, the ledger management platform may selectively identify one or more nodes based on the first broadcast rule. In this case, the ledger management platform may use a public key to decrypt the application to identify information that may be used to select one or more nodes for the broadcast. For example, the application may include a field with a blockchain identifier of the individual, a field with a country identifier for a country in which the individual has a credit score or has performed transactions that may be used to determine a credit score, a field identifying a particular type of credit that the individual had in the second country, a field identifying a particular organization that provided credit to the individual in the second country, and/or the like.

Continuing with the example, the ledger management platform may use the identified information to select one or more nodes for the broadcast. For example, if the application includes the blockchain identifier of the individual, the ledger management platform may use the blockchain identifier of the individual to search a data structure that associates the blockchain identifier of the individual with particular organizations or nodes (e.g., organizations that have credit worthiness information of the individual may already have the blockchain identifier of the individual). As another example, if the application includes a country identifier for a country in which the individual has a credit score, the ledger management platform may use the country identifier to search a data structure that associates the country identifier with particular organizations or nodes that operate in the second country.

As another example, the ledger management platform may identify all of the nodes as targets for the broadcast based on the second broadcast rule. For example, the ledger management platform may be configured with the second broadcast rule indicating to broadcast the application questions to all nodes, which may cause the ledger management platform to select all of the nodes as targets for the broadcast.

As another example, the ledger management platform may selectively identify one or more nodes that support a smart contract that is compliant with data privacy laws of a country in which the individual has a credit score or has performed transactions that may be used to determine a credit score. In this case, the ledger management platform may use a public key to decrypt the application to identify a country identifier for a country in which the individual has a credit score or has performed the transactions that may be used to determine the credit score. Additionally, the ledger management platform may use the country identifier to reference a data structure that associates the country identifier with the smart contract that is in compliance with the data privacy laws of the second country. As such, the ledger management platform is able to identify one or more nodes with the country identifier, and may select the one or more nodes as targets for the broadcast.

As shown by reference number 126, the ledger management platform may broadcast the encrypted application questions to the selected nodes. For example, the ledger management platform may broadcast the encrypted application questions using an API or a similar type of interface. In some cases, such as when the ledger management platform has to decrypt the application to access information in the application that is needed to select particular nodes for the broadcast, the ledger management platform may create a copy of the encrypted application, may decrypt the copy of the encrypted application (e.g., to identify information needed to select particular nodes), and may broadcast the encrypted application to the selected nodes.

In other cases, the ledger management platform may only decrypt certain information within the application, and may leave the application questions encrypted. For example, the ledger management platform may decrypt a blockchain identifier of the individual or a country identifier associated with the individual, and may leave the application questions encrypted. This may allow the ledger management platform to use the blockchain identifier or the country identifier to select particular nodes as targets for the broadcast, without having to decrypt the application questions (e.g., which need to remain encrypted when broadcast to the selected nodes).

As shown by reference number 128, the one or more nodes that receive the broadcast may decrypt the application questions and generate one or more application responses. For example, the one or more nodes may decrypt the application questions using a public key that has been securely provisioned to each node, as described elsewhere herein. By decrypting the application questions, the application questions may be viewed on an interface associated with each node, such that employees of each organization may provide application responses based on the type of information that each organization has about the individual.

As shown as an example, a second organization may have access to a credit score of the individual in the second country, and may provide the credit score as an application response to the application question that asks for the individual's credit score. Additionally, a third organization may have access to the individual's income, and may provide the income as an application response to the application question that asks for the individual's income. Additional organizations may respond to the broadcast by providing other credit information and/or rating information, such as an amount of outstanding debt, a mortgage payment history, a ride sharing rating with a popular ride sharing service, and/or the like.

In some implementations, a node may automatically generate an application response. For example, a data source of the second organization may store credit information for the individual, and the node may use the blockchain identifier of the individual or personal data of the individual to search the data source to identify the credit information of the individual. In this case, the node may use a natural language processing technique to parse through the application questions and/or the stored credit information to identify information that may be used as responses for the application questions. As such, the node may select the information as information to include in the application response.

In this way, the ledger management platform is able to broadcast the encrypted application questions to the one or more nodes to permit the one or more nodes to generate application responses.

Figure 1F:
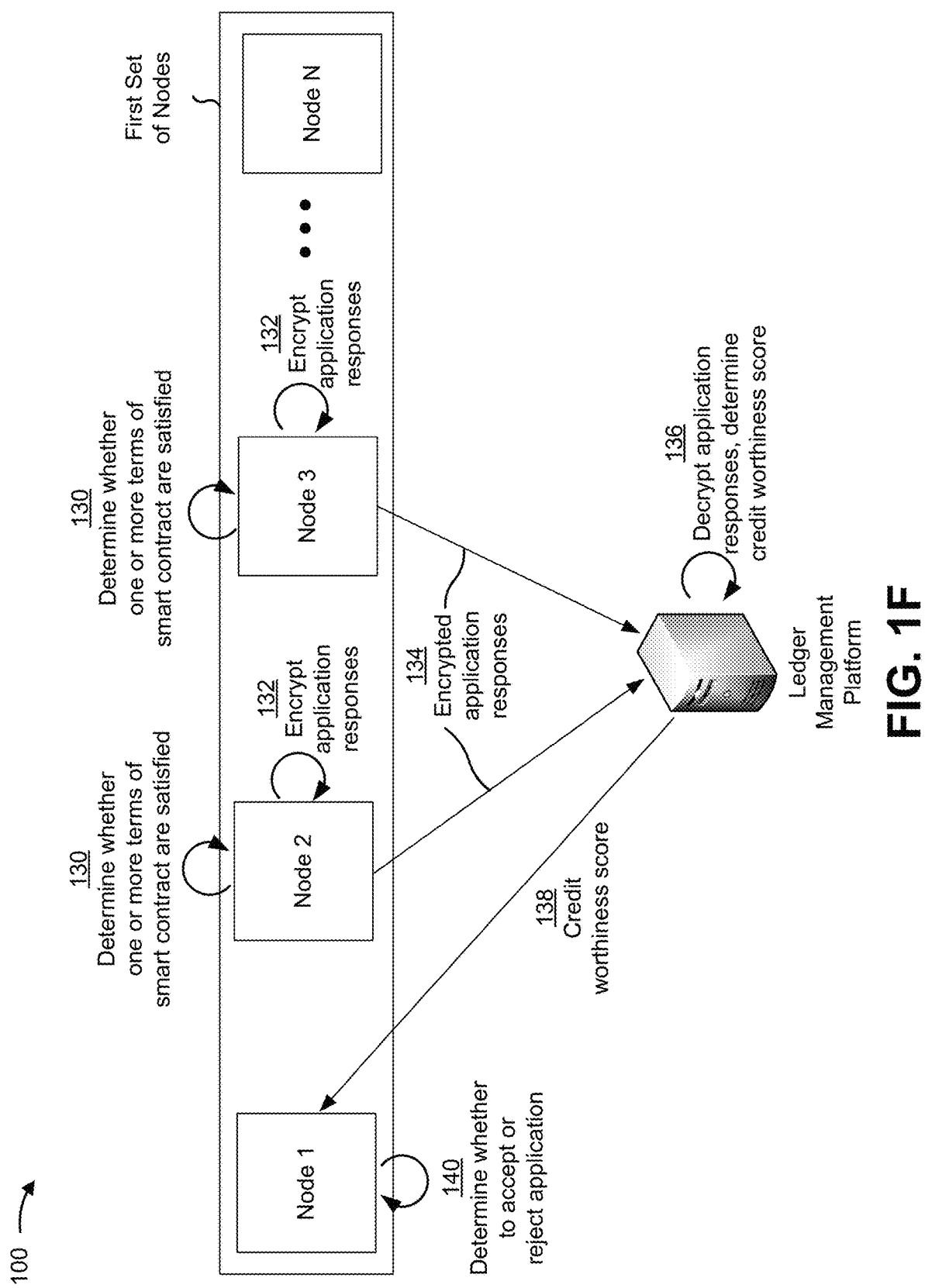

As shown in FIG. 1F, and by reference number 130, the one or more nodes that generated application responses may determine whether one or more conditions of the smart contract are satisfied. For example, a node that generated an application response (e.g., the second node, the third node, etc.) may provide an application response as input to the smart contract to cause the smart contract to output an indication of whether one or more conditions have been satisfied. As described above, the one or more conditions of the smart contract may be conditions that, if satisfied, cause the ledger management platform to orchestrate providing payment to the organization (e.g., payment for providing the first organization with the credit worthiness information of the individual). Additionally, satisfying one or more conditions of the smart contract may allow a particular node to store, in the distributed ledger, a record of the particular node satisfying one or more of the conditions of the smart contract, as described further herein.

As shown by reference number 132, each node may encrypt an application response that has been generated. For example, the one or more nodes may encrypt the application response using one or more techniques described elsewhere herein. As shown by reference number 134, each node may provide the encrypted application responses to the ledger management platform.

As shown by reference number 136, the ledger management platform may decrypt the application responses, using a technique described elsewhere herein, and may process the application responses to determine a credit worthiness score of the individual. For example, the application responses may include credit information and/or rating information relating to the individual, and the ledger management platform may determine the credit worthiness score as a function of the credit information and/or the rating information. As an example, the application responses might identify the individual's credit score, income, mortgage payment history, ride sharing score, and/or the like, and the ledger management platform may apply a credit scoring algorithm that is able to determine the credit worthiness score (e.g., by assigning weights to particular types of application responses, and determining a weighted average).

As shown by reference number 138, the ledger management platform may provide the credit worthiness score to the first node. As shown by reference number 140, the first node may determine whether to accept or reject the application based on the credit worthiness score. For example, the first node may accept applications with a credit worthiness score above a particular scoring threshold. Additionally, or alternatively, the first node may use the credit worthiness score to determine an amount of credit to offer the individual after approving the application. In some cases, rather than request a credit worthiness score, the first organization may use the first node to request all of the credit worthiness information of the individual, and may use an internal credit scoring algorithm to determine whether to accept the individual's application for credit.

In this way, the ledger management platform is able to determine a credit worthiness score that is able to be used by the first node to determine whether to accept or reject the individual's application for credit.

Figure 1H:
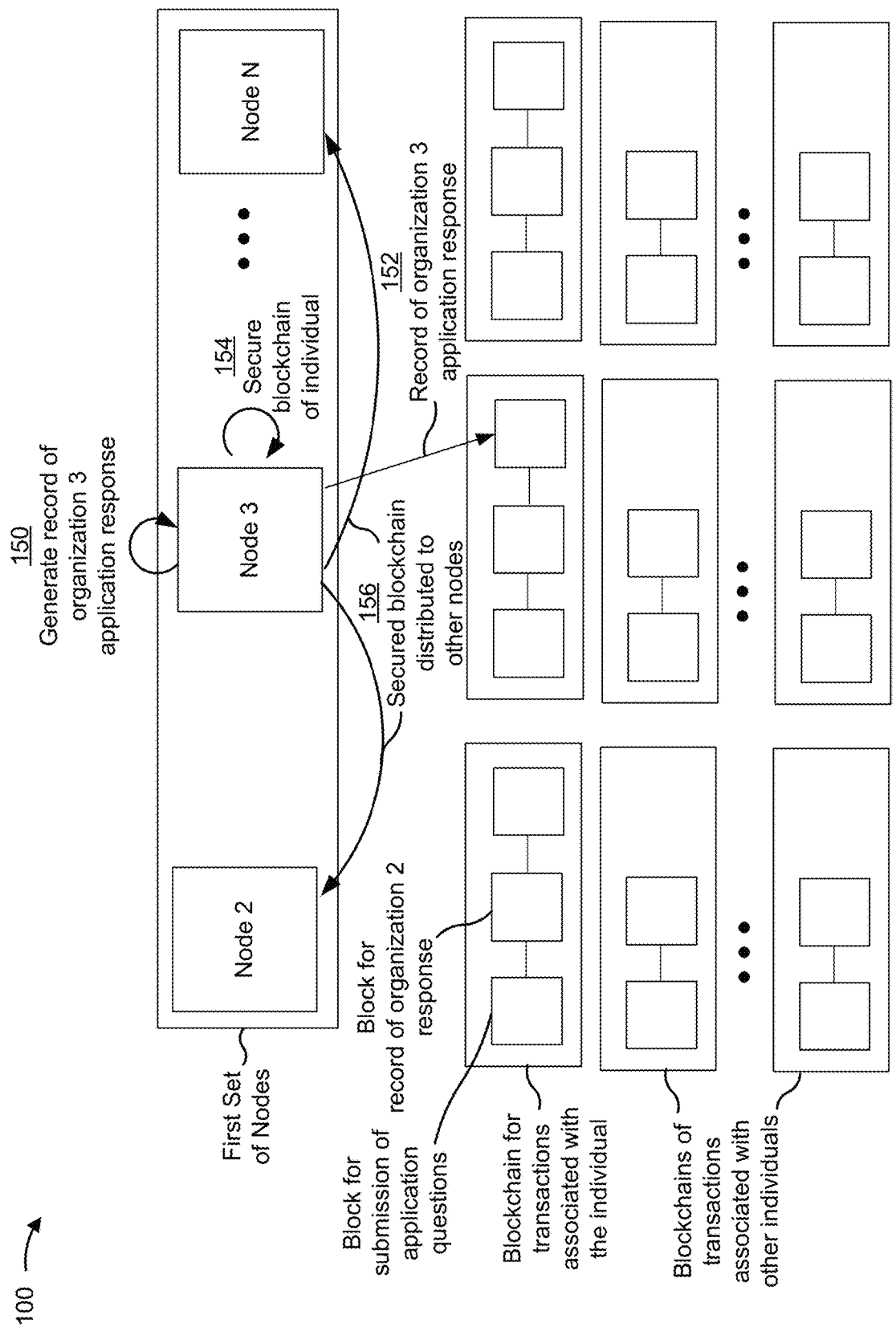

As shown in FIGS. 1G and 1H, each request for information or response to a request for information may be stored as a transaction in the distributed ledger. For example, the distributed ledger may be supported using one or more blockchain data structures, whereby each blockchain provides a complete record of all transactions associated with a particular individual.

As shown in FIG. 1G, and by reference number 142, the second node may generate a record of an application response provided by the second organization. For example, the second node may be configured to generate a record of an application response if one or more conditions of the smart contract are satisfied.

The record may indicate the application responses that were provided, which conditions of the smart contract were satisfied by the application responses, a transaction identifier to identify the transaction within the blockchain, personal information of the individual (e.g., metadata indicating application responses, metadata summarizing application responses, etc.), and/or the like.

In some cases, the record may not include personal information of the individual. For example, some data privacy laws require that personal information of an individual be stored in a manner that allows the personal information to be purged upon request of the individual. However, the immutable nature of the blockchain may make removal of the personal information of the individual difficult. As such, information included in a record may omit personal information of the individual, such that a request for removal of the personal information would not be needed.

As shown by reference number 144, the second node may store the record of the application response as a transaction in a blockchain associated with the individual. For example, the second node may look up the blockchain of the individual using the blockchain identifier of the individual that was provided as part of the broadcast to the second node. In this case, the second node may store the record as a transaction in the blockchain. As shown, the blockchain associated with the individual may already include a first block that is a record of the application questions that were broadcast to one or more nodes in the network. As such, the application response may be stored as a second block in the blockchain of the individual.

In some cases, as shown, each record or transaction may be stored in the blockchain as a separate block. In other cases, different data storage logic may be used, such that a block is used to store multiple records or transactions.

As shown by reference number 146, the second node may secure the blockchain that includes the record of the transaction. For example, the second node may, after adding the record to the blockchain, generate a cryptographic hash of the blockchain. In this case, each block in the blockchain may include the cryptographic hash of the prior block, such that the two blocks are linked. Additionally, the cryptographic hash may be stored using a data structure, such as a Merkle tree, which may store hashed data in a manner that allows other nodes in the network to verify the hashed data.

As shown by reference number 148, the second node may provide the secured blockchain that includes the added transaction to the other nodes in the network. In some implementations, the second node may provide the secured blockchain to the ledger management platform, which may distribute the secured blockchain to the other nodes in the network. In some cases, such as when different sets of nodes are utilizing different smart contracts, the second node may provide the secured blockchain to nodes that use the same smart contract.

As shown by reference number 150, the other nodes in the network (e.g., all nodes except the second node, all nodes in a particular set of nodes except the second node, etc.) may verify the transaction that has been added to the blockchain. For example, the other nodes may perform another cryptographic hash of the secured blockchain that allows the other nodes to verify the transaction that has been added to the blockchain.

As shown in FIG. 1H, the third node may update the distributed ledger in a manner similar to that described with respect to the second node. For example, and as shown by reference number 152, the third node may generate a record of an application response provided by the third organization. As shown by reference number 154, the third node may store the record of the application response as a new transaction in the blockchain associated with the individual.

As shown by reference number 156, the third node may secure the blockchain associated with the individual. As shown by reference number 158, the third node may provide the secured blockchain to the other nodes in the network. As shown by reference number 160, the other nodes in the network may verify the transaction.

In this way, the one or more nodes are able to update the distributed ledger such that the distributed ledger includes a secure blockchain describing all transactions relating to the individual.

Figure 1I:
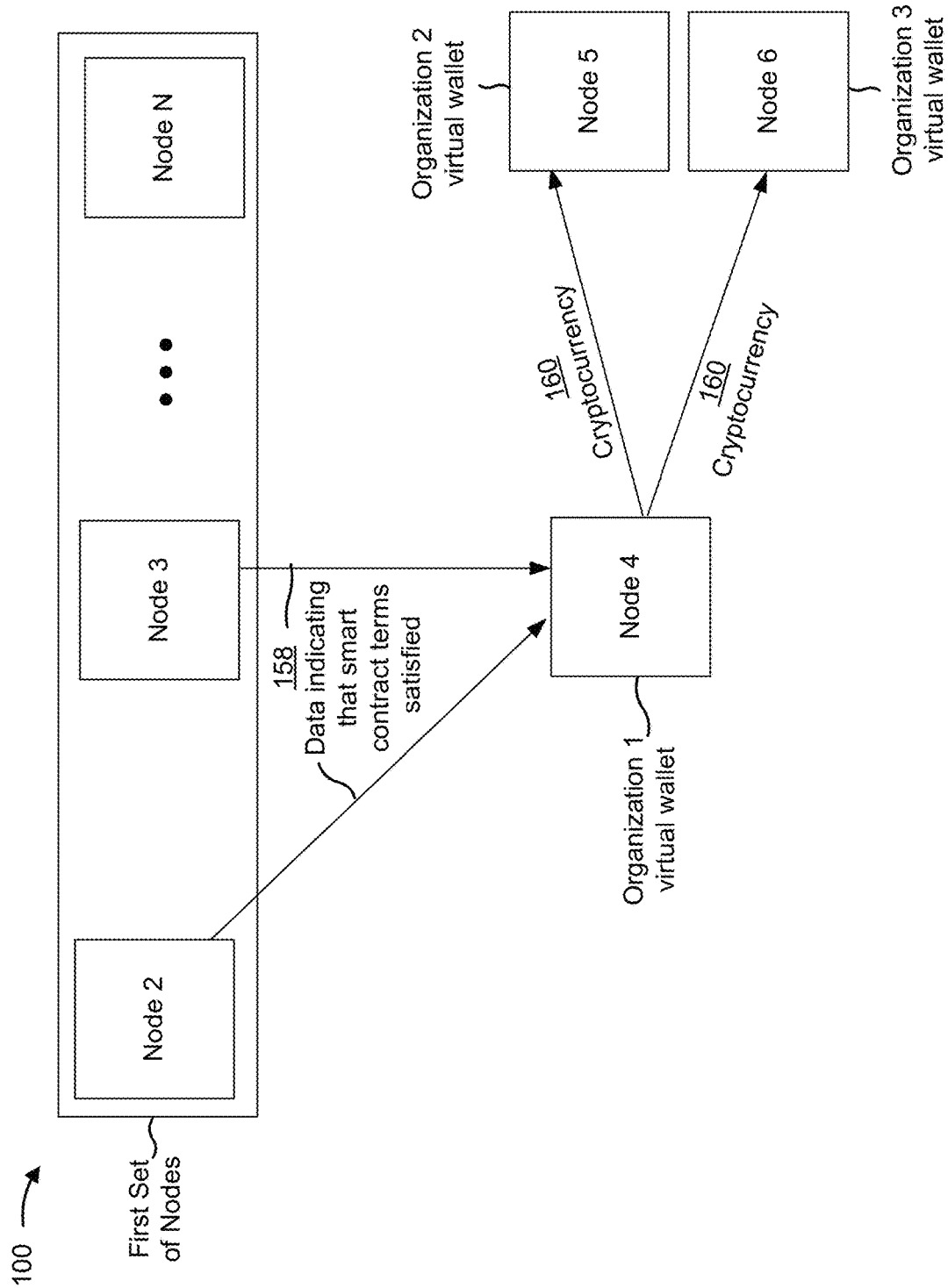

As shown in FIG. 1I, and by reference number 162, the second node and the third node may provide, to a fourth node (e.g., a virtual wallet associated with the first organization), data indicating that one or more conditions of the smart contract have been satisfied. For example, the second node and the third node may be configured with a smart contract that is to provide cryptocurrency as payment if one or more conditions are satisfied. As such, the second node and third node may provide the fourth node with proof that one or more conditions of the smart contract have been satisfied.

As shown by reference number 164, the fourth node may provide cryptocurrency as payment to a fifth node and a sixth node that are associated with virtual wallets of the second organization and the third organization. Payment may be made using cryptocurrency or a similar form of payment.

In this way, organizations are able to be compensated for responding to requests for information that are broadcast throughout the network.

Figure 1J:
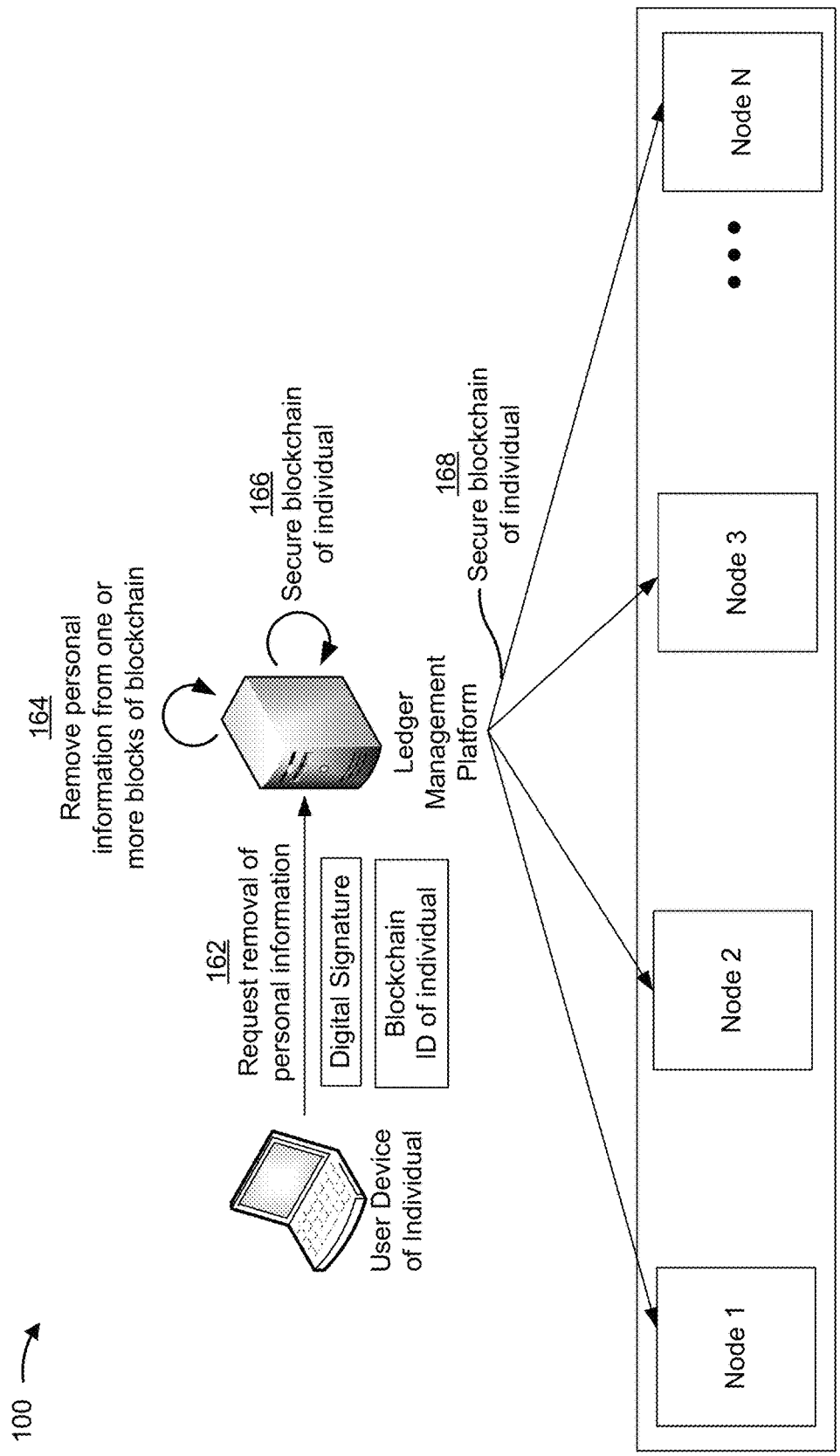

As shown in FIG. 1J, the ledger management platform may orchestrate removal of personal information of the individual from the distributed ledger. For example, assume that the blockchain of the individual included personal information, and that data privacy laws allow the individual to request removal of the personal information.

As shown by reference number 166, the ledger management may receive, from a user device associated with the individual, a request to remove personal information of the individual. The request may include the digital signature of the individual and the blockchain identifier of the individual.

As shown by reference number 168, the ledger management platform may remove personal information from one or more blocks of the blockchain of the individual. For example, personal information of the individual may be stored within block metadata that describes each transaction stored by the blockchain. To obtain authorization to remove the personal information from the blockchain, the ledger management platform may use the digital signature and the blockchain identifier of the individual. In some implementations, removal of the personal information may require the blockchain to be a permissions-based blockchain.

As shown by reference number 170, the ledger management platform may secure the blockchain after modifying transactions to no longer include the personal information of the individual. For example, the ledger management platform may use a specialized cryptographic hash function that, with the private key of the individual, is able to generate one or more cryptographic hashes of one or more blocks of the blockchain. In some cases, the specialized cryptographic hash function may be able to create hash collisions, such that a transaction that includes personal information of the individual and a modified transaction that excludes the personal information would produce an identical hashed value. This may allow an otherwise immutable blockchain to be modified in special circumstances such as where a law may require that an individual's personal information be removed.

In some cases, each block that includes removed personal information may store metadata describing the removal. For example, a transaction that had personal information removed may include metadata describing a time at which the information was removed, the authorization of the individual who requested the removal, a summary of the type of information that was removed, and/or the like.

As shown by reference number 172, the ledger management platform may provide the secure blockchain of the individual to the other nodes in the network. In this case, the other nodes in the network may perform one or more additional actions to verify the validity of the blockchain (e.g., such as by using the specialized cryptographic hash function to perform an independent validation of the blockchain).

In this way, the ledger management platform is able to orchestrate removal of personal information from the distributed ledger.

As indicated above, FIGS. 1A-1J are provided merely as an example. Other examples are possible and may differ from what was described with regard to FIGS. 1A-1J. For example, there may be additional devices and/or networks, fewer devices and/or networks, different devices and/or networks, or differently arranged devices and/or networks than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) of example implementations 100 may perform one or more functions described as being performed by another set of devices of example implementations 100.

Figure 2:
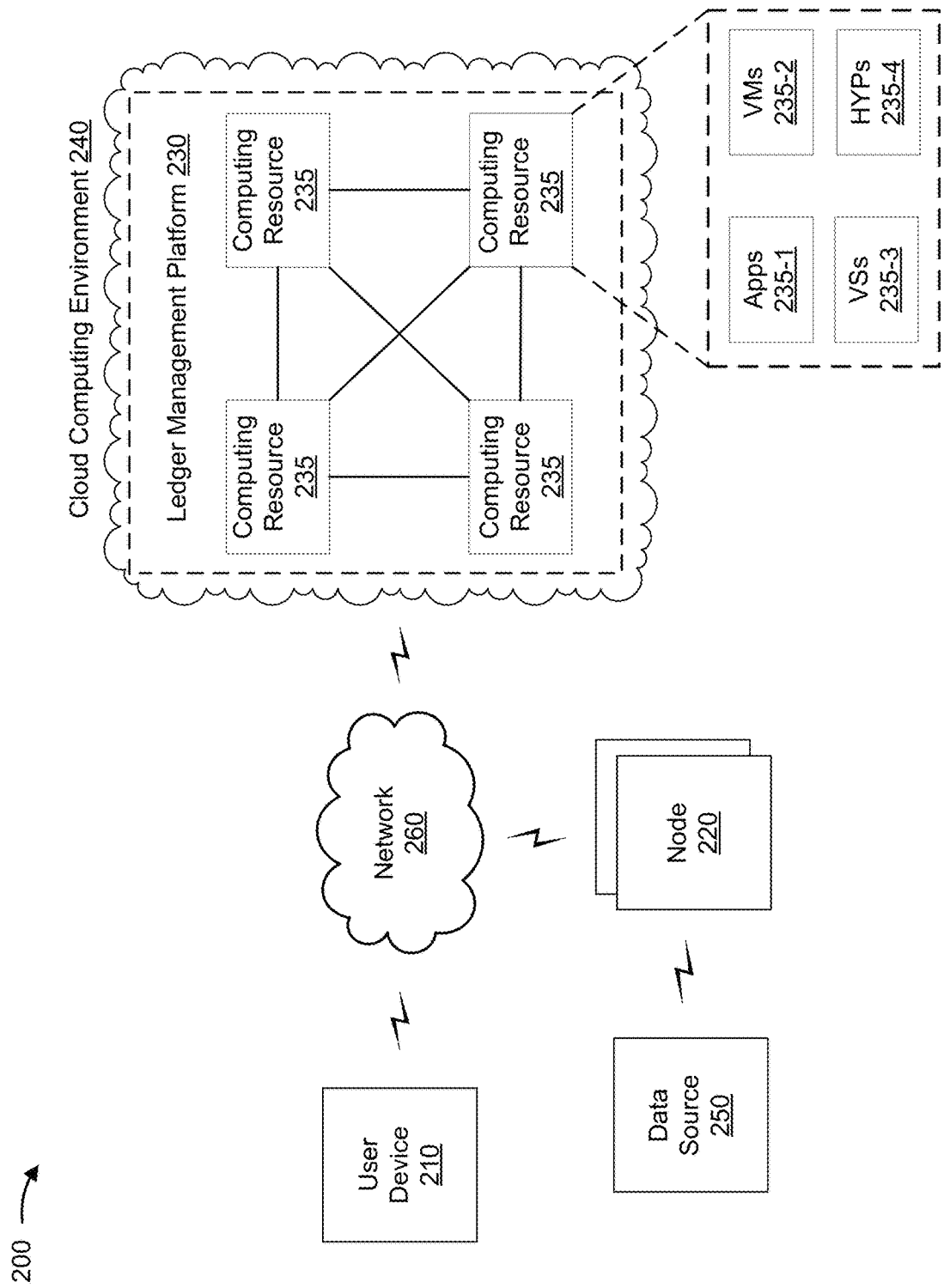
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, one or more nodes 220, a ledger management platform 230 supported by a cloud computing environment 240, a data source 250, and/or a network 260. Devices of environment 200 may interconnect via wired connections, wireless connections, or a combination of wired and wireless connections.

User device 210 includes one or more devices capable of receiving, generating, storing, processing, and/or providing information associated with an application for credit. For example, user device 210 may include a communication and/or computing device, such as a mobile phone (e.g., a smart phone, a radiotelephone, etc.), a laptop computer, a tablet computer, a handheld computer, a server computer, a gaming device, a wearable communication device (e.g., a smart wristwatch, a pair of smart eyeglasses, etc.), or a similar type of device. In some implementations, user device 210 may provide, to ledger management platform 230, a request to remove personal information of an individual.

Node 220 includes one or more devices capable of receiving, generating, storing, processing, and/or providing information associated with credit worthiness information of an individual. For example, node 220 may include a communication and/or computing device, such as a server device, a desktop computer, a laptop computer, a tablet computer, a handheld computer, a mobile phone (e.g., a smart phone, a radiotelephone, etc.), or a similar type of device.

In some implementations, node 220 may be a node in a network that has access to a distributed ledger that is supported by a blockchain. In some implementations, node 220 may be installed on a device associated with an organization that wants to use the distributed ledger for sharing credit worthiness information of individuals. In some implementations, node 220 may be a server that is not local to an organization that wants to use the distributed ledger (e.g., a server in a data center), and may be assigned to the organization that wants to use the distributed ledger. In this case, an employee of the organization may interact with an interface of a device associated with the organization to access one or more services provided by node 220.

In some implementations, node 220 may be used to generate an application for credit. In some implementations, node 220 may receive an application for credit from a device associated with an organization that has access to the distributed ledger. In some implementations, node 220 may provide ledger management platform 230 with a request for a credit worthiness score of an individual. In some implementations, node 220 may provide encrypted application responses to ledger management platform 230.

In some implementations, node 220 may be part of a network of nodes 220 that are not managed by a management node. In some implementations, node 220 may be part of a network of nodes 220 that are managed by ledger management platform 230.

Ledger management platform 230 includes one or more devices capable of receiving, generating, storing, processing, and/or providing information associated with credit worthiness information of an individual. For example, ledger management platform 230 may include a server device (e.g., a host server, a web server, an application server, etc.), a data center device, or a similar device. In some implementations, ledger management platform 230 may be part of a network of nodes 220 that have access to a distributed ledger that is supported by a blockchain.

In some implementations, ledger management platform 230 may interact with one or more devices associated with organizations to sign the organizations up for access to the distributed ledger. In some implementations, ledger management platform 230 may provide instructions on how to access the distributed ledger to the one or more devices associated with the organizations.

In some implementations, ledger management platform 230 may interact with one or more nodes 220 to orchestrate distribution of credit worthiness information of an individual. In some implementations, ledger management platform 230 may receive requests for a credit worthiness score for an individual. In some implementations, ledger management platform 230 may broadcast, to one or more nodes 220, application questions for an individual's application for credit. In some implementations, ledger management platform 230 may receive application responses from one or more nodes 220.

In some implementations, ledger management platform 230 may provide smart contracts to devices associated with validation entities, and may receive validated smart contracts from the devices associated with validation entities. In some implementations, ledger management platform 230 may provide smart contracts to nodes 220.

In some implementations, ledger management platform 230 may provide a credit worthiness score of an individual to node 220. In some implementations, ledger management platform 230 may provide the secure blockchain of an individual to node 220 (e.g., a blockchain that has been hashed with a new transaction).

In some implementations, as shown, ledger management platform 230 may be hosted in cloud computing environment 240. Notably, while implementations described herein describe ledger management platform 230 as being hosted in cloud computing environment 240, in some implementations, ledger management platform 230 might not be cloud-based (i.e., may be implemented outside of a cloud computing environment) or might be partially cloud-based.

Cloud computing environment 240 includes an environment that delivers computing as a service, whereby shared resources, services, etc. may be provided to user device 210, node 220, data source 250, and/or ledger management platform 230. Cloud computing environment 240 may provide computation, software, data access, storage, and/or other services that do not require end-user knowledge of a physical location and configuration of a system and/or a device that delivers the services. As shown, cloud computing environment 240 may include a ledger management platform 230 and one or more computing resources 235.

Computing resource 235 includes one or more personal computers, workstation computers, server devices, or another type of computation and/or communication device. In some implementations, computing resource 235 may host ledger management platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections. In some implementations, computing resource 235 may perform one or more functions or implementations described as being performed by node 220.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by user device 210. Application 235-1 may eliminate a need to install and execute the software applications on user device 210. For example, application 235-1 may include software associated with ledger management platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., user device 210), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Data source 250 includes one or more devices capable of receiving, storing, generating, processing, and/or providing information associated with an organization. For example, data source 250 may include a server device or a group of server devices. In some implementations, data source 250 may store credit worthiness information associated with an individual.

Network 260 includes one or more wired and/or wireless networks. For example, network 260 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
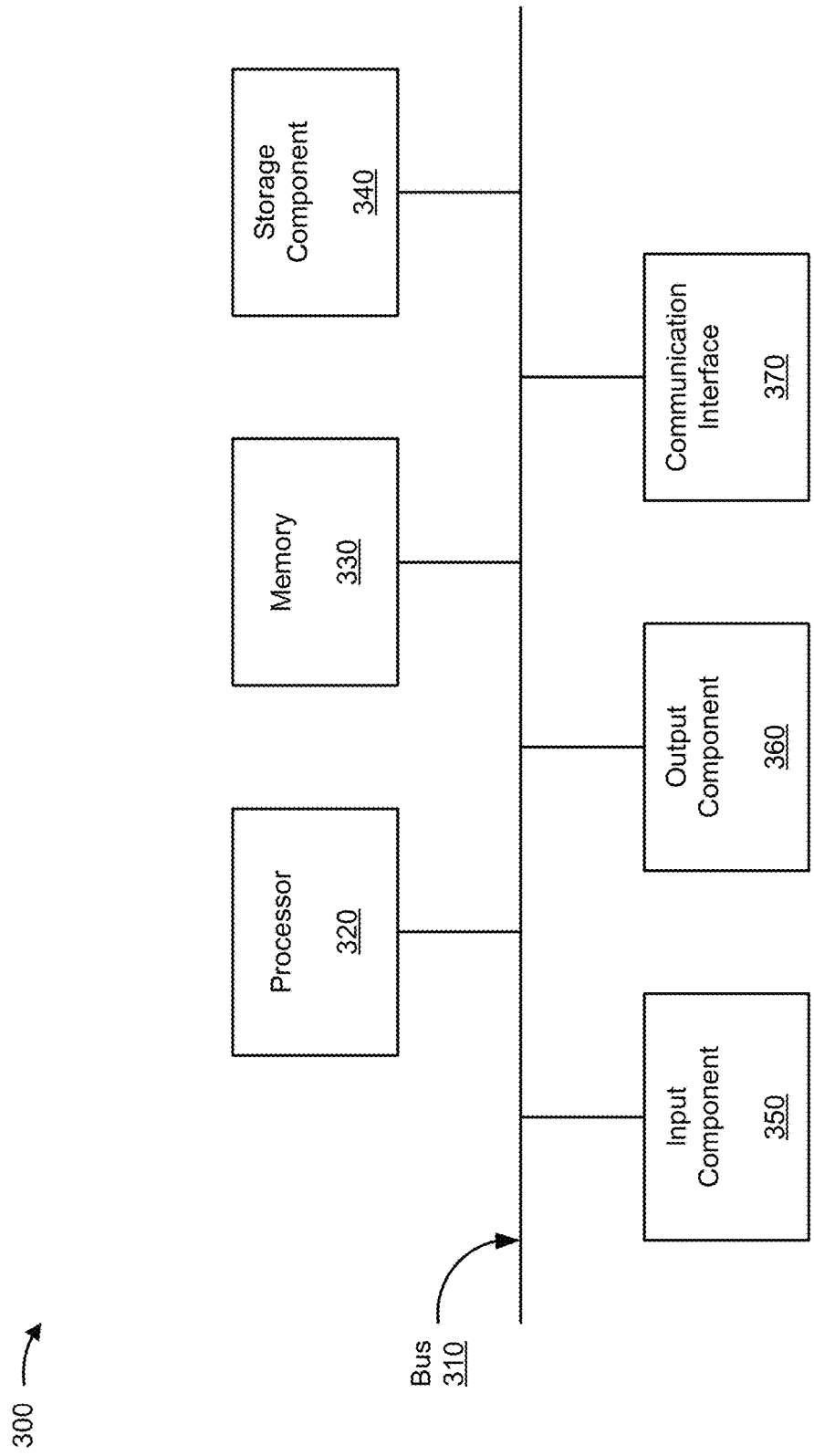
FIG. 3 is a diagram of example components of one or more devices of FIG. 2.

FIG. 3 is a diagram of example components of a device 300. Device 300 may correspond to user device 210, node 220, ledger management platform 230, computing resource 235, and/or data source 250. In some implementations, user device 210, node 220, ledger management platform 230, computing resource 235, and/or data source 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
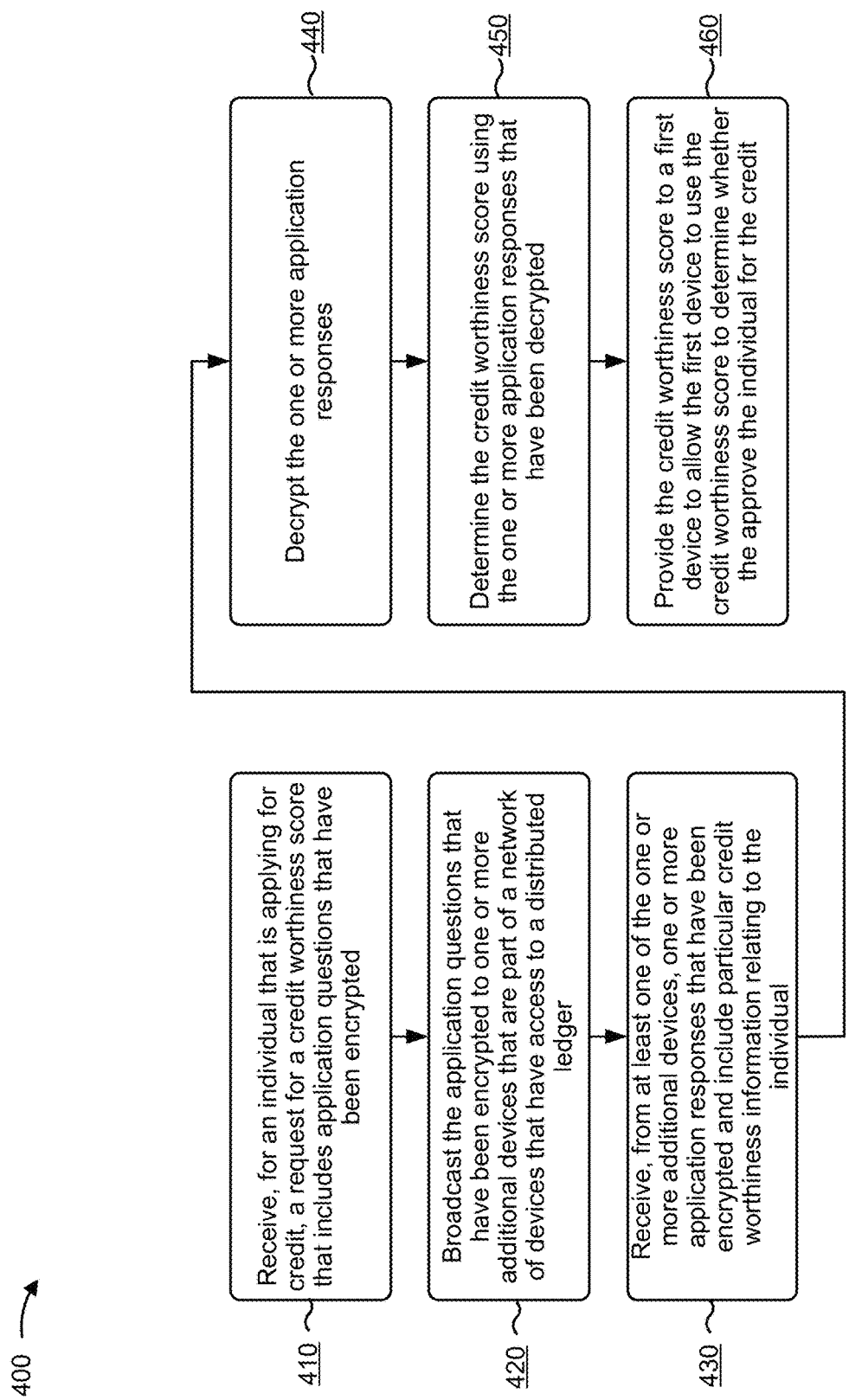
FIGS. 4-6 are flow charts of an example process for using a secure distributed ledger to manage sharing of credit worthiness information of individuals.

FIG. 4 is a flow chart of an example process 400 for using a secure distributed ledger to manage sharing of credit worthiness information of individuals. In some implementations, one or more process blocks of FIG. 4 may be performed by a ledger management platform (e.g., ledger management platform 230). In some implementations, one or more process blocks of FIG. 4 may be performed by another device or a group of devices separate from or including the ledger management platform, such as a user device (e.g., user device 210), one or more nodes (e.g., one or more nodes 220), and/or a data source (e.g., data source 250).

As shown in FIG. 4, process 400 may include receiving, from a first device, a request for a credit worthiness score for an individual that is applying for credit (block 410). For example, the ledger management platform (e.g., using processor 320, memory 330, input component 350, communication interface 370, etc.) may receive, from a first device (e.g., a first node of the one or more nodes), a request for a credit worthiness score for an individual that is applying for credit, as described above in connection with FIGS. 1A-1J.

In some implementations, the first device may be associated with an organization offering the credit. In some implementations, the request may include application questions that have been encrypted using a private key associated with a digital signature of the individual. In some implementations, the first device may be part of a network of devices that have access to a distributed ledger for sharing credit worthiness information of a group of individuals.

As further shown in FIG. 4, process 400 may include broadcasting the application questions that have been encrypted to one or more additional devices to cause at least one of the one or more additional devices to generate an application response that includes responses to the application questions, record the application response in the distributed ledger, and provide the application response to the device (block 420). For example, the ledger management platform (e.g., using processor 320, output component 360, communication interface 370, etc.) may broadcast the application questions that have been encrypted to one or more additional devices (e.g., one or more nodes) to cause at least one of the one or more additional devices to generate an application response that includes responses to the application questions, record the application response in the distributed ledger, and provide the application response to the ledger management platform, as described above in connection with FIGS. 1A-1J. In some implementations, the one or more additional devices may be part of the network of devices that have access to the distributed ledger.

As further shown in FIG. 4, process 400 may include receiving, from at least one of the one or more additional devices, one or more application responses that have been encrypted (block 430). For example, the ledger management platform (e.g., using processor 320, input component 350, communication interface 370, etc.) may receive, from at least one of the one or more additional devices, one or more application responses that have been encrypted, as described above in connection with FIGS. 1A-1J. In some implementations, each application response, of the one or more application responses, may include particular credit worthiness information relating to the individual.

As further shown in FIG. 4, process 400 may include decrypting the one or more application responses (block 440). For example, the ledger management platform (e.g., using processor 320, etc.) may decrypt the one or more application responses, as described above in connection with FIGS. 1A-1J.

As further shown in FIG. 4, process 400 may include determining the credit worthiness score using the one or more application responses that have been decrypted (block 450). For example, the ledger management platform (e.g., using processor 320, etc.) may determine the credit worthiness score using the one or more application responses that have been decrypted, as described above in connection with FIGS. 1A-1J.

As further shown in FIG. 4, process 400 may include providing the credit worthiness score to the first device to allow the first device to use the credit worthiness score to determine whether to approve the individual for the credit (block 460). For example, the ledger management platform (e.g., using processor 320, output component 360, communication interface 370, etc.) may provide the credit worthiness score to the first device to allow the first device to use the credit worthiness score to determine whether to approve the individual for the credit, as described above in connection with FIGS. 1A-1J.

Process 400 may include additional aspects, such as any single aspect or any combination of aspects described below and/or in connection with one or more other processes described elsewhere herein.

In some implementations, the individual may apply for the credit in a first country and the particular credit worthiness information may relate to transactions performed by the individual in a second country.

In some implementations, the ledger management platform may receive, from a first group of additional devices of the one or more additional devices, credit information for the individual. Additionally, the ledger management platform may receive, from a second group of additional devices of the one or more additional devices, rating information that includes one or more ratings associated with the individual based on historical transactions with one or more particular organizations. In some implementations, the ledger management platform may determine the credit worthiness score as a function of the credit information and the rating information.

In some implementations, the ledger management platform may selectively identify, before broadcasting the application questions, the one or more additional devices as targets for the broadcast, based on a broadcast rule. In some implementations, the broadcast rule may be a first broadcast rule to select the one or more additional devices based on information identified in the request for the credit worthiness score, a second broadcast rule to select the one or more additional devices based on the one or more additional devices having access to the distributed ledger, a third broadcast rule to select the one or more additional devices based on the one or more additional devices supporting a smart contract that is compliant with data privacy laws of a country in which the individual has previously performed transactions, and/or the like.

In some implementations, the ledger management platform may validate, before receiving the request for the credit worthiness score, a smart contract that is to be used to provide cryptocurrency in exchange for the particular credit worthiness information of the individual. In some implementations, the ledger management platform may validate the smart contract using a machine learning model that is trained on information indicating data privacy laws of a plurality of jurisdictions associated with the group of individuals and historical smart contracts. In some implementations, the ledger management platform may validate the smart contact using a validation technique performed by a particular group of devices associated with one or more validation entities. In some implementations, the ledger management platform may provide the smart contract to the first device and to the one or more additional devices.

In some implementations, the ledger management platform may provide, before receiving the request and to the one or more additional devices, a smart contract that includes executable instructions capable of verifying whether the particular credit worthiness information is in compliance with data privacy laws of a particular jurisdiction. In some implementations, when broadcasting the application questions, the ledger management platform may broadcast the application questions to the one or more additional devices to cause at least one of the one or more additional devices to generate the application response that includes the particular credit worthiness information relating to the individual, and provide the application response as input to the smart contract to cause the smart contract to verify that the particular credit worthiness information complies with the data privacy laws of the particular jurisdiction.

In some implementations, the distributed ledger may be supported by a blockchain, and the ledger management platform may receive, from the user device associated with the individual, a particular request to remove the particular credit worthiness information of the individual from the distributed ledger. In some implementations, the particular request may include the private key and a blockchain identifier for the individual. In some implementations, the ledger management platform may identify the particular credit worthiness information of the individual using the blockchain identifier. In some implementations, the ledger management platform may perform one or more actions associated with using the private key to remove the particular credit worthiness information from the distributed ledger. In some implementations, removal of the particular credit worthiness information may be able to be cryptographically proven.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
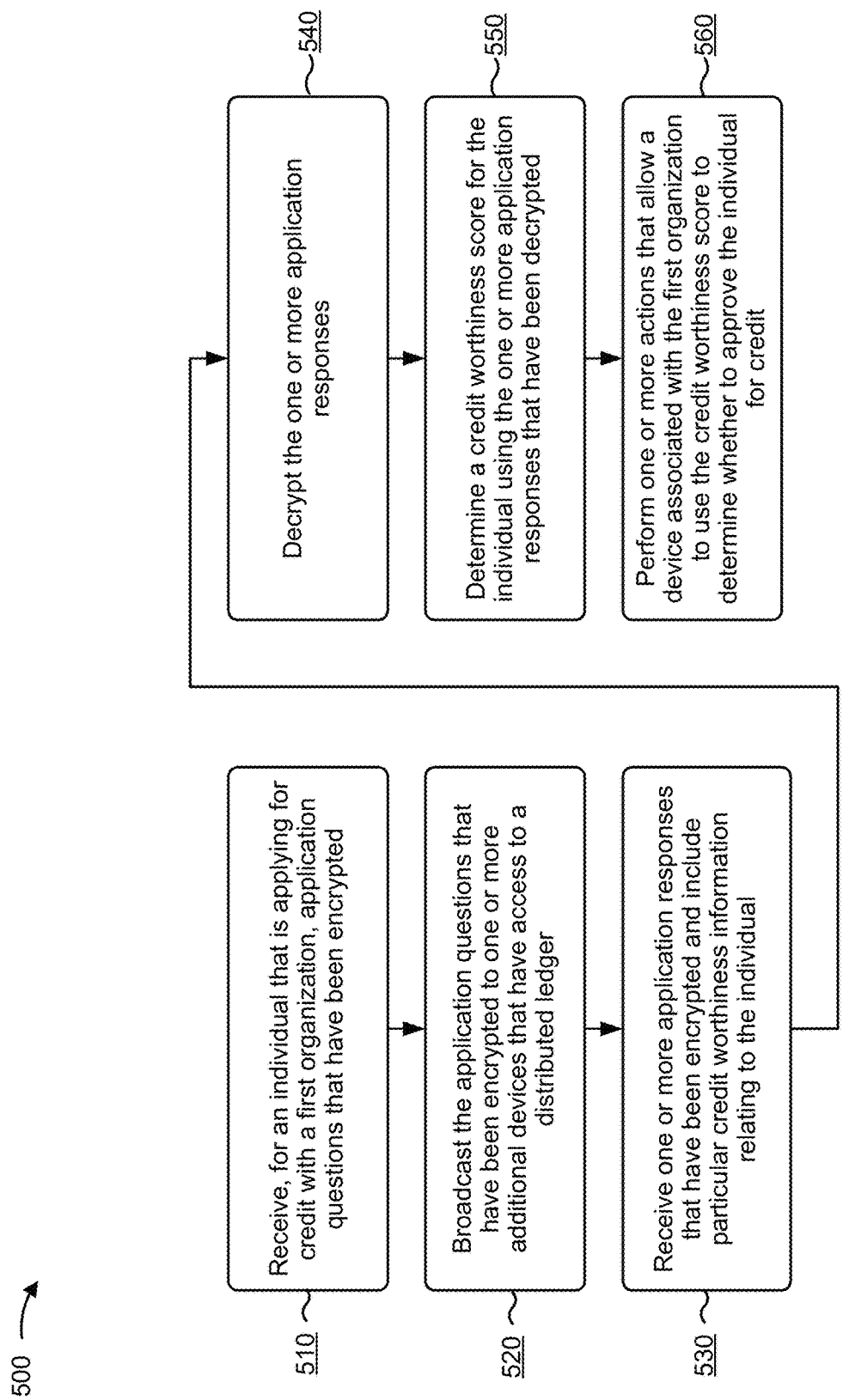

FIG. 5 is a flow chart of an example process 500 for using a secure distributed ledger to manage sharing of credit worthiness information of individuals. In some implementations, one or more process blocks of FIG. 5 may be performed by a ledger management platform (e.g., ledger management platform 230). In some implementations, one or more process blocks of FIG. 5 may be performed by another device or a group of devices separate from or including the ledger management platform, such as a user device (e.g., user device 210), one or more nodes (e.g., one or more nodes 220), and/or a data source (e.g., data source 250).

As shown in FIG. 5, process 500 may include receiving application questions for an individual that is applying for credit with a first organization (block 510). For example, the ledger management platform (e.g., using processor 320, memory 330, input component 350, communication interface 370, etc.) may receive application questions for an individual that is applying for credit with a first organization, as described above in connection with FIGS. 1A-1J. In some implementations, the ledger management platform may be part of a network of devices that have access to a distributed ledger for sharing credit worthiness information for a group of individuals. In some implementations, the application questions may have been encrypted using a private key associated with the individual.

As further shown in FIG. 5, process 500 may include broadcasting the application questions to one or more additional devices, that have access to the distributed ledger, to cause at least one of the one or more additional devices to generate an application response that includes responses to the application questions, process the application response using a smart contract, and provide the application response to the device (block 520). For example, the ledger management platform (e.g., using processor 320, output component 360, communication interface 370, etc.) may broadcast the application questions to one or more additional devices (e.g., one or more of the nodes), that have access to the distributed ledger, to cause at least one of the one or more additional devices to generate an application response that includes responses to the application questions, process the application response using a smart contract, and provide the application response to the device, as described above in connection with FIGS. 1A-1J.

As further shown in FIG. 5, process 500 may include receiving, from at least one of the one or more additional devices, one or more application responses that have been encrypted (block 530). For example, the ledger management platform (e.g., using processor 320, input component 350, communication interface 370, etc.) may receive, from at least one of the one or more additional devices, one or more application responses that have been encrypted, as described above in connection with FIGS. 1A-1J. In some implementations, each application response, of the one or more application responses, may include particular credit worthiness information relating to the individual.

As further shown in FIG. 5, process 500 may include decrypting the one or more application responses (block 540). For example, the ledger management platform (e.g., using processor 320, etc.) may decrypt the one or more application responses, as described above in connection with FIGS. 1A-1J.

As shown in FIG. 5, process 500 may include determining a credit worthiness score for the individual using the one or more application responses (block 550). For example, the ledger management platform (e.g., using processor 320, etc.) may determine a credit worthiness score for the individual using the one or more application responses, as described above in connection with FIGS. 1A-1J.

As further shown in FIG. 5, process 500 may include performing one or more actions that allow the device or another device associated with the first organization to use the credit worthiness score to determine whether to approve the individual for credit (block 560). For example, the ledger management platform (e.g., using processor 320, input component 350, output component 360, communication interface 370, etc.) may perform one or more actions that allow the device or another device associated with the first organization to use the credit worthiness score to determine whether to approve the individual for credit, as described above in connection with FIGS. 1A-1J.

Process 500 may include additional aspects, such as any single aspect or any combination of aspects described below and/or in connection with one or more other processes described elsewhere herein.

In some implementations, the particular credit worthiness information may include credit information for the individual or rating information indicating a rating associated with the individual based on historical transactions with a particular organization. In some implementations, the individual may be applying for the credit in a first country and the particular credit worthiness information for the individual may relate to transactions performed by the individual in a second country.

In some implementations, the ledger management platform may selectively identify the one or more additional devices as targets to receive the application questions based on a broadcast rule. In some implementations, the broadcast rule may indicate to selectively identify particular devices that are associated with identifiers of organizations that transacted with the individual in a country in which the individual has previously performed transactions.

In some implementations, the ledger management platform may store, after providing the application questions to the one or more additional devices, the application questions in the distributed ledger as a transaction associated with the individual. In some implementations, the ledger management platform may provide data specifying the transaction to the one or more additional devices to permit the one or more additional devices to add the data specifying the transaction to a copy of the distributed ledger.

In some implementations, the ledger management platform may receive, from an additional device of the one or more additional devices, an indication that a particular application response satisfied one or more conditions of the smart contract. In some implementations, the additional device may be associated with a second organization that transacted with the individual in a country in which the individual has previously performed transactions. In some implementations, the ledger management platform may cause cryptographic currency to transfer from a first account associated with the first organization to a second account associated with the second organization, based on receiving the indication that the particular application response satisfied the one or more conditions of the smart contract.

In some implementations, the ledger management platform may receive, after broadcasting the application questions and from a particular device included in the network of devices, an indication that a particular application response did not comply with data privacy laws of a first country in which the individual used to reside and/or a second country in which the individual is applying for the credit. In some implementations, the ledger management platform may perform one or more actions associated with removal of the particular application response from the distributed ledger. In some implementations, the ledger management platform may provide, to the particular device, one or more recommendations on how to modify the particular application response to put the particular application response in compliance with the data privacy laws.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
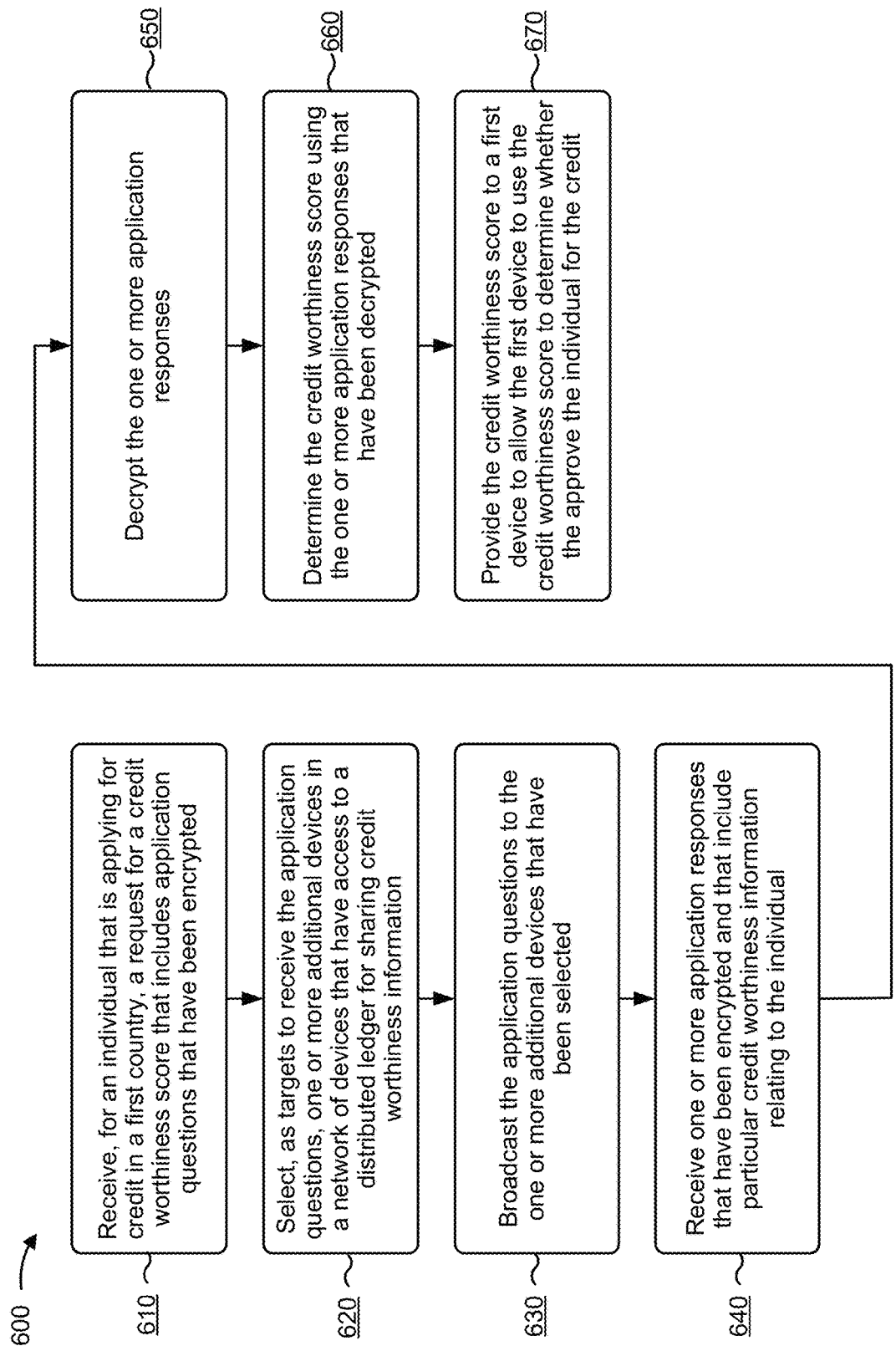

FIG. 6 is a flow chart of an example process 600 for using a secure distributed ledger to manage sharing of credit worthiness information of individuals. In some implementations, one or more process blocks of FIG. 6 may be performed by a ledger management platform (e.g., ledger management platform 230). In some implementations, one or more process blocks of FIG. 6 may be performed by another device or a group of devices separate from or including the ledger management platform, such as a user device (e.g., user device 210), one or more nodes (e.g., one or more nodes 220), and/or a data source (e.g., data source 250).

As shown in FIG. 6, process 600 may include receiving a request for a credit worthiness score for an individual that is applying for credit in a first country (block 610). For example, the ledger management platform (e.g., using processor 320, input component 350, communication interface 370, etc.) may receive a request for a credit worthiness score for an individual that is applying for credit in a first country, as described above in connection with FIGS. 1A-1J. In some implementations, the first device may be associated with an organization offering the credit. In some implementations, the request may include application questions that have been encrypted. In some implementations, the first device may be part of a network of devices that have access to a distributed ledger for sharing credit worthiness information of a group of individuals.

As further shown in FIG. 6, process 600 may include selecting one or more additional devices in the network of devices as targets to receive the application questions (block 620). For example, the ledger management platform (e.g., using processor 320, etc.) may select one or more additional devices (e.g., one or more of the nodes) in the network of devices as targets to receive the application questions, as described above in connection with FIGS. 1A-1J.

As further shown in FIG. 6, process 600 may include broadcasting the application questions to the one or more additional devices that have been selected to permit at least one of the one or more additional devices to generate an application response that includes responses to the application questions and provide the application response to the one or more processors (block 630). For example, the ledger management platform (e.g., using processor 320, output component 360, communication interface 370, etc.) may broadcast the application questions to the one or more additional devices that have been selected to permit at least one of the one or more additional devices to generate an application response that includes responses to the application questions and to provide the application response to one or more processors associated with the ledger management platform, as described above in connection with FIGS. 1A-1J.

As further shown in FIG. 6, process 600 may include receiving, from at least one of the one or more additional devices, one or more application responses that have been encrypted (block 640). For example, the ledger management platform (e.g., using processor 320, input component 350, communication interface 370, etc.) may receive, from at least one of the one or more additional devices, one or more application responses that have been encrypted, as described above in connection with FIGS. 1A-1J. In some implementations, each application response, of the one or more application responses, may include particular credit worthiness information relating to transactions performed by the individual in a second country.

As further shown in FIG. 6, process 600 may include decrypting the one or more application responses (block 650). For example, the ledger management platform (e.g., using processor 320, etc.) may decrypt the one or more application responses, as described above in connection with FIGS. 1A-1J.

As further shown in FIG. 6, process 600 may include determining the credit worthiness score using the one or more application responses that have been decrypted (block 660). For example, the ledger management platform (e.g., using processor 320, etc.) may determine the credit worthiness score using the one or more application responses that have been decrypted, as described above in connection with FIGS. 1A-1J.

As further shown in FIG. 6, process 600 may include providing the credit worthiness score to the first device to allow the first device to use the credit worthiness score to determine whether to approve the individual for the credit (block 670). For example, the ledger management platform (e.g., using processor 320, memory 330, storage component 340, and/or the like) may provide the credit worthiness score to the first device to allow the first device to use the credit worthiness score to determine whether to approve the individual for the credit, as described above in connection with FIGS. 1A-1J.

Process 600 may include additional aspects, such as any single aspect or any combination of aspects described below and/or in connection with one or more other processes described elsewhere herein.

In some implementations, the particular credit worthiness information may include credit information for the individual or rating information indicating a rating associated with the individual based on historical transactions with a particular organization.

In some implementations, the ledger management platform may selectively identify the one or more additional devices as targets for the broadcast based on a broadcast rule. In some implementations, the broadcast rule may include a first broadcast rule to select the one or more additional devices based on information identified in the request for the credit worthiness score, a second broadcast rule to select the one or more additional devices based on the one or more additional devices having access to the distributed ledger, a third broadcast rule to select the one or more additional devices based on the one or more additional devices supporting a smart contract that is compliant with data privacy laws of the second country in which the individual has previously performed transactions, and/or the like.

In some implementations, the ledger management platform may store the credit worthiness score in the distributed ledger as a particular transaction associated with the individual. In some implementations, one or more blocks of a blockchain may be used to store a record of transactions associated with the individual. In some implementations, the one or more blocks may also store a first transaction associated with the application questions and one or more additional transactions associated with the one or more application responses. In some implementations, the ledger management platform may provide, to the first device and the one or more additional devices, a copy of the distributed ledger that includes the particular transaction.

In some implementations, the ledger management platform may determine the credit worthiness score based on a condition being satisfied. In some implementations, the condition may be an expiration of a timer or receipt of a threshold number of received application responses.

In some implementations, the ledger management platform may receive a particular request to remove information relating to the individual from the distributed ledger. In some implementations, the particular request may include an identifier for the individual that is capable of identifying a storage location in the distributed ledger that is used to store the information relating to the individual and a private key associated with the individual. In some implementations, the ledger management platform may identify the information relating to the individual using the identifier. In some implementations, the ledger management platform may perform one or more actions associated with using the private key to remove the information relating to the individual.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, the ledger management platform is able to provide a credit worthiness score that may be used to determine whether to approve an individual for credit. Additionally, the ledger management platform is able to facilitate the distribution of credit worthiness information in a manner that is flexible, secure, distributed, and automated. For example, flexibility is provided by enabling execution of various smart contracts to ensure that credit worthiness information is shared in a manner that is compliant with laws of different jurisdictions.

Additionally, security is provided by supporting a distributed ledger with a tamper-resistant data structure (e.g., a blockchain), by implementing various forms of authentication, by restricting access to the distributed ledger to particular parties, and/or the like. For example, the distributed ledger may improve security by preserving an immutable record of credit worthiness information, by using cryptographic links between blocks of the distributed ledger (e.g., reducing the potential for unauthorized tampering with the credit worthiness information), and/or the like. Security is further improved as a result of devices that have access to the distributed ledger independently verifying each transaction that is added to the distributed ledger. Moreover, use of a distributed ledger also provides failover protection, in that the ledger management platform may continue to operate in a situation where one or more devices that have access to the distributed ledger fail.

Furthermore, several different stages of the process for managing credit worthiness information are automated, which may remove human subjectivity and waste from the process, and which may improve speed and efficiency of the process and conserve computing resources (e.g., processor resources, memory resources, and/or the like). Additionally, implementations described herein use a rigorous, computerized process to perform tasks or roles that were not previously performed or were previously performed using subjective human intuition or input. Finally, automating the process for managing credit worthiness information conserves computing resources (e.g., processor resources, memory resources, and/or the like) that would otherwise be wasted by using multiple different types of devices with different software, protocols, and configurations, and computing resources that would otherwise be wasted correcting problems that would arise from lack of consistency in the application of various transactions related to the credit worthiness information.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

To the extent embodiments and/or implementations described herein utilize personal information (referred to in some jurisdictions as personally identifiable information (PII)), it should be understood that such personal information is to be used in accordance with all applicable laws concerning protection of that personal information. Furthermore, in many cases, use of the information may be subject to consent of an individual. Moreover, storage of the information may utilize various encryption techniques to protect the security and integrity of the information. Additionally, some jurisdictions may include laws indicating that the information is to be stored in a manner that allows the individual the request removal of the information, may include laws indicating that particular types of information are unable to be stored, and/or the like.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device and from a first group of devices, credit information for an individual;
receiving, by the device and from a second group of devices, rating information that includes one or more ratings associated with the individual based on historical transactions with one or more particular organizations;
determining, by the device, a credit worthiness score as a function of the credit information and the rating information;
storing, by the device, the credit worthiness score in a distributed ledger as a particular transaction associated with the individual;
receiving, by the device and from a user device associated with the individual, a particular request to remove particular credit worthiness information, of the credit information or the rating information, from the distributed ledger,
wherein the particular request includes a private key and a blockchain identifier for the individual;
identifying, by the device and in the distributed ledger, the particular credit worthiness information using the blockchain identifier; and
performing, by the device, one or more actions associated with the private key to remove the particular credit worthiness information from the distributed ledger.

2. The method of claim 1, wherein the credit information includes:
first credit information, received from a first device of the first group of devices, associated with a first country; and
second credit information, received from a second device of the first group of devices, associated with a second country.

3. The method of claim 1, wherein the rating information includes:
first rating information, received from a first device of the second group of devices, associated with a first country; and
second rating information, received from a second device of the second group of devices, associated with a second country.

4. The method of claim 1, further comprising:
storing, in the distributed ledger, metadata indicating that the particular credit worthiness information was removed from the distributed ledger.

5. The method of claim 1, wherein performing the one or more actions comprises:
generating, using a cryptographic hash function, a modified transaction associated with the particular transaction,
wherein the particular transaction and the modified transaction, when hashed using the cryptographic hash function, are associated with an identical hash value.

6. The method of claim 1, further comprising:
receiving, from another device, application questions associated with the individual,
wherein the other device is part of a network of devices that have access to the distributed ledger for sharing credit worthiness information for a group of individuals;
providing the other device with response data,
the response data including the credit worthiness information; and
storing, in the distributed ledger, data associated with the application questions and the response data.

7. The method of claim 1, further comprising:
receiving, from another device, application questions associated with the individual,
wherein the other device is part of a network of devices that have access to the distributed ledger for sharing credit worthiness information for a group of individuals; and
broadcasting the application questions to one or more additional devices, that have access to the distributed ledger, to cause at least one of the one or more additional devices to:
generate response data that includes responses to the application questions, and
provide the response data to the other device.

8. A device, comprising:
one or more memories; and
one or more processors, communicatively connected to the one or more memories, to:
receive, from a first group of devices, credit information for an individual;
receive, from a second group of devices, rating information that includes one or more ratings associated with the individual based on historical transactions with one or more particular organizations;
determine a credit worthiness score as a function of the credit information and the rating information;
store the credit worthiness score in a distributed ledger as a particular transaction associated with the individual;
receive, from a user device associated with the individual, a particular request to remove particular credit worthiness information, of the credit information or the rating information, from the distributed ledger,
wherein the particular request includes a private key and a blockchain identifier for the individual;

identify, in the distributed ledger, the particular credit worthiness information using the blockchain identifier; and perform one or more actions associated with the private key to remove the particular credit worthiness information from the distributed ledger.

9. The device of claim 8, wherein the credit information includes:

first credit information, received from a first device of the first group of devices, associated with a first country; and second credit information, received from a second device of the first group of devices, associated with a second country.

10. The device of claim 8, wherein the rating information includes:

first rating information, received from a first device of the second group of devices, associated with a first country; and second rating information, received from a second device of the second group of devices, associated with a second country.

11. The device of claim 8, wherein the one or more processors are to:

store, in the distributed ledger, metadata indicating that the particular credit worthiness information was removed from the distributed ledger.

12. The device of claim 8, wherein the one or more processors, when performing the one or more actions, are to:

generate, using a cryptographic hash function, a modified transaction associated with the particular transaction, wherein the particular transaction and the modified transaction, when hashed using the cryptographic hash function, are associated with an identical hash value.

13. The device of claim 8, wherein the one or more processors are to:

receive, from another device, application questions associated with the individual, wherein the other device is part of a network of devices that have access to the distributed ledger for sharing credit worthiness information for a group of individuals;

provide the other device with response data, the response data including the credit worthiness information; and store, in the distributed ledger, data associated with the application questions and the response data.

14. The device of claim 8, wherein the one or more processors are to:

receive, from another device, application questions associated with the individual, wherein the other device is part of a network of devices that have access to the distributed ledger for sharing credit worthiness information for a group of individuals; and broadcast the application questions to one or more additional devices, that have access to the distributed ledger, to cause at least one of the one or more additional devices to:

generate response data that includes responses to the application questions, and provide the response data to the other device.

15. A non-transitory computer-readable medium storing instructions, the instructions comprising:

one or more instructions that, when executed by one or more processors, cause the one or more processors to:

receive, from a first group of devices, credit information for an individual;

receive, from a second group of devices, rating information that includes one or more ratings associated with the individual based on historical transactions with one or more particular organizations;

determine a credit worthiness score as a function of the credit information and the rating information;

store the credit worthiness score in a distributed ledger as a particular transaction associated with the individual;

receive, from a user device associated with the individual, a particular request to remove particular credit worthiness information, of the credit information or the rating information, from the distributed ledger, wherein the particular request includes a private key and a blockchain identifier for the individual;

identify, in the distributed ledger, the particular credit worthiness information using the blockchain identifier; and perform one or more actions associated with the private key to remove the particular credit worthiness information from the distributed ledger.

16. The non-transitory computer-readable medium of claim 15, wherein the credit information includes:

first credit information, received from a first device of the first group of devices, associated with a first country; and second credit information, received from a second device of the first group of devices, associated with a second country.

17. The non-transitory computer-readable medium of claim 15, wherein the rating information includes:

first rating information, received from a first device of the second group of devices, associated with a first country; and second rating information, received from a second device of the second group of devices, associated with a second country.

18. The non-transitory computer-readable medium of claim 15, wherein the one or more instructions, when executed by the one or more processors, further cause the one or more processors to:

store, in the distributed ledger, metadata indicating that the particular credit worthiness information was removed from the distributed ledger.

19. The non-transitory computer-readable medium of claim 15, wherein the one or more instructions, that cause the one or more processors to perform the one or more actions, cause the one or more processors to:

generate, using a cryptographic hash function, a modified transaction associated with the particular transaction, wherein the particular transaction and the modified transaction, when hashed using the cryptographic hash function, are associated with an identical hash value.

20. The non-transitory computer-readable medium of claim 15, wherein the one or more instructions, when executed by the one or more processors, further cause the one or more processors to:

receive, from another device, application questions associated with the individual, wherein the other device is part of a network of devices that have access to the distributed ledger for sharing credit worthiness information for a group of individuals;

provide the other device with response data, the response data including the credit worthiness information; and store, in the distributed ledger, data associated with the application questions and the response data.

* * * * *